(12) United States Patent
Wang et al.

(10) Patent No.: US 11,082,973 B2
(45) Date of Patent: Aug. 3, 2021

(54) UPSTREAM TIMING CONTROL MECHANISMS FOR NON-TERRESTRIAL NETWORKS

(71) Applicant: QUALCOMM Incorporated, San Diego, CA (US)

(72) Inventors: Xiao Feng Wang, San Diego, CA (US); Iyab Issam Sakhnini, San Diego, CA (US); Alberto Rico Alvarino, San Diego, CA (US); Peter Gaal, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 16/444,954

(22) Filed: Jun. 18, 2019

(65) Prior Publication Data

US 2019/0394770 A1 Dec. 26, 2019

Related U.S. Application Data

(60) Provisional application No. 62/687,529, filed on Jun. 20, 2018.

(51) Int. Cl.
*H04W 72/04* (2009.01)
*H04W 76/28* (2018.01)

(52) U.S. Cl.
CPC ....... *H04W 72/0446* (2013.01); *H04W 76/28* (2018.02)

(58) Field of Classification Search
CPC .............. H04B 7/1851; H04B 7/18513; H04B 7/18515; H04B 7/18523; H04B 7/18528;
(Continued)

(56) References Cited

U.S. PATENT DOCUMENTS

| | | | | |
|---|---|---|---|---|
| 5,790,939 A | * | 8/1998 | Malcolm ............ | H04B 7/18513 455/13.2 |
| 5,809,397 A | * | 9/1998 | Harthcock ........... | H04B 7/2125 455/13.2 |

(Continued)

FOREIGN PATENT DOCUMENTS

| | | | | |
|---|---|---|---|---|
| BR | 112016021569 A2 | * | 7/2018 | ............ H04W 56/00 |
| CA | 2970923 A1 | * | 9/2015 | ............. H04B 7/195 |

(Continued)

OTHER PUBLICATIONS

International Search Report and Written Opinion—PCT/US2019/038007—ISA/EPO—dated Sep. 10, 2019.

*Primary Examiner* — Eric Nowlin
(74) *Attorney, Agent, or Firm* — Holland & Hart LLP

(57) ABSTRACT

Methods, systems, and devices for wireless communications that support upstream timing control mechanisms for non-terrestrial networks are described. Generally, the described techniques provide for wireless communications from a user equipment (UE) in wireless communication with a satellite. A gateway in the non-terrestrial networks may receive an upstream transmission from the UE in wireless communication with the satellite and determine a timing adjustment for a second upstream transmission from the UE based on the upstream transmission from the UE. The gateway may then transmit to the UE in a group control information message or a dedicated physical channel message, a timing command indicating the timing adjustment for the second upstream transmission. The UE may receive the second timing adjustment and transmit data over the second upstream transmission using the second timing adjustment.

31 Claims, 16 Drawing Sheets

(58) Field of Classification Search
CPC ............. H04B 7/1853; H04B 7/18576; H04B 7/18589; H04B 7/2125; H04W 56/0045
See application file for complete search history.

(56) References Cited

U.S. PATENT DOCUMENTS

| | | | | |
|---|---|---|---|---|
| 6,366,761 | B1 * | 4/2002 | Montpetit | H04B 7/195 370/230 |
| 7,155,340 | B2 * | 12/2006 | Churan | H04B 7/18563 701/469 |
| 7,421,342 | B2 * | 9/2008 | Churan | G01S 19/21 342/357.59 |
| 7,453,920 | B2 * | 11/2008 | Churan | H04B 7/2125 370/515 |
| 7,974,261 | B2 * | 7/2011 | Lane | H04W 56/0045 370/350 |
| 8,036,205 | B2 * | 10/2011 | Lane | H04B 7/1851 370/350 |
| 8,130,948 | B2 * | 3/2012 | Earnshaw | H04H 20/74 380/34 |
| 8,526,941 | B2 * | 9/2013 | Tseytlin | H04B 7/18591 455/427 |
| 9,386,550 | B2 * | 7/2016 | Becker | H04B 7/18513 |
| 9,749,035 | B2 * | 8/2017 | Vasavada | H04B 7/1851 |
| 9,949,221 | B2 * | 4/2018 | Yamada | H04W 56/0005 |
| 9,973,264 | B2 * | 5/2018 | Vasavada | H04B 7/195 |
| 10,020,873 | B2 * | 7/2018 | Uchino | H04B 7/18513 |
| 10,554,293 | B1 * | 2/2020 | Chin | H04W 56/0065 |
| 10,693,574 | B2 * | 6/2020 | Wu | H04L 5/14 |
| 10,805,000 | B2 * | 10/2020 | Black | H04W 72/042 |
| 2004/0092257 | A1 * | 5/2004 | Chung | H04B 7/2041 455/429 |
| 2004/0097192 | A1 * | 5/2004 | Schiff | H04B 7/18515 455/12.1 |
| 2004/0142660 | A1 * | 7/2004 | Churan | H04B 7/216 455/12.1 |
| 2004/0203393 | A1 * | 10/2004 | Chen | H04B 7/18563 455/63.1 |
| 2005/0095982 | A1 * | 5/2005 | Blanchard | H04B 7/2126 455/12.1 |
| 2005/0118948 | A1 * | 6/2005 | Karabinis | H04B 7/216 455/12.1 |
| 2006/0280199 | A1 * | 12/2006 | Lane | H04W 56/00 370/458 |
| 2006/0280200 | A1 * | 12/2006 | Lane | H04B 7/2125 370/458 |
| 2006/0281476 | A1 * | 12/2006 | Lane | H04B 7/185 455/502 |
| 2007/0030967 | A1 * | 2/2007 | Earnshaw | G01S 5/0284 380/209 |
| 2007/0233383 | A1 * | 10/2007 | Churan | G01S 19/254 701/469 |
| 2008/0182572 | A1 * | 7/2008 | Tseytlin | H04B 7/18591 455/427 |
| 2011/0256865 | A1 * | 10/2011 | Sayeed | H04B 7/18589 455/427 |
| 2012/0017247 | A1 * | 1/2012 | Hodson | H04H 20/74 725/67 |
| 2012/0257513 | A1 * | 10/2012 | Yamada | H04L 1/1861 370/248 |
| 2013/0028198 | A1 * | 1/2013 | Yamada | H04W 48/20 370/329 |
| 2013/0070666 | A1 * | 3/2013 | Miller | H04B 7/18543 370/326 |
| 2013/0329630 | A1 * | 12/2013 | Becker | H04W 56/0015 370/326 |
| 2015/0270890 | A1 * | 9/2015 | Vasavada | H04B 7/195 370/326 |
| 2016/0173188 | A1 * | 6/2016 | Uchino | H04B 7/18513 370/316 |
| 2017/0005741 | A1 * | 1/2017 | Wu | H04B 7/2041 |
| 2017/0027017 | A1 * | 1/2017 | Black | H04B 7/18513 |
| 2017/0180038 | A1 * | 6/2017 | Oza | H04B 7/2041 |
| 2017/0288769 | A1 * | 10/2017 | Miller | H04B 7/18515 |
| 2017/0367116 | A1 * | 12/2017 | Li | H04W 52/0216 |
| 2017/0371040 | A1 * | 12/2017 | Whitefield | G01S 19/21 |
| 2018/0006710 | A1 * | 1/2018 | Buer | H04B 7/18521 |
| 2018/0013484 | A1 * | 1/2018 | Vasavada | H04B 7/195 |
| 2018/0019809 | A1 * | 1/2018 | Hreha | H04B 10/118 |
| 2018/0241464 | A1 * | 8/2018 | Michaels | H04B 7/18513 |
| 2018/0317123 | A1 * | 11/2018 | Chen | H04W 72/0413 |
| 2019/0020406 | A1 * | 1/2019 | Lindqvist | H04B 7/18517 |
| 2019/0058522 | A1 * | 2/2019 | Haley | H04W 52/0216 |
| 2019/0268874 | A1 * | 8/2019 | Ravishankar | H04W 68/02 |
| 2019/0342845 | A1 * | 11/2019 | Laselva | H04W 56/0045 |
| 2019/0349077 | A1 * | 11/2019 | Alasti | H04B 7/18513 |
| 2019/0349877 | A1 * | 11/2019 | Alasti | H04B 7/18513 |
| 2019/0364586 | A1 * | 11/2019 | Li | H04W 72/04 |
| 2019/0394770 | A1 * | 12/2019 | Wang | H04W 76/28 |
| 2020/0205108 | A1 | 6/2020 | Alasti et al. | |
| 2020/0252145 | A1 * | 8/2020 | Wu | H04B 7/2041 |
| 2020/0295824 | A1 * | 9/2020 | Charbit | H04L 5/0055 |
| 2020/0313760 | A1 * | 10/2020 | Laws | H04B 7/18517 |
| 2020/0351918 | A1 * | 11/2020 | Wang | H04W 72/046 |

FOREIGN PATENT DOCUMENTS

| | | | | |
|---|---|---|---|---|
| CN | 107333241 | A * | 11/2017 | |
| CN | 110446254 | A * | 11/2019 | |
| CN | 110611949 | A * | 12/2019 | |
| EP | 1750382 | A2 * | 2/2007 | ............... G01S 5/10 |
| EP | 3120466 | A1 * | 1/2017 | ............ H04B 7/1851 |
| EP | 3120466 | A4 * | 1/2018 | ............ H04W 56/00 |
| GB | 2428946 | A * | 2/2007 | ............ H04H 40/90 |
| GB | 2428946 | B * | 8/2010 | ............ H04H 20/74 |
| MX | 2016012140 | A * | 5/2017 | ............. H04B 7/195 |
| MX | 357494 | B * | 7/2018 | ............ H04W 56/00 |
| WO | WO-2005088865 | A1 * | 9/2005 | ............. H04B 7/216 |
| WO | WO-2015143252 | A1 * | 9/2015 | ............ H04B 7/1851 |
| WO | WO-2019217029 | A1 * | 11/2019 | ......... H04B 7/18513 |
| WO | WO-2019246276 | A1 * | 12/2019 | ............ H04W 76/28 |
| WO | WO-2020089471 | A1 * | 5/2020 | ............ H04B 7/1855 |

* cited by examiner

UPSTREAM TIMING CONTROL MECHANISMS FOR NON-TERRESTRIAL NETWORKS

CROSS REFERENCE

The present Application for Patent claims the benefit of U.S. Provisional Patent Application No. 62/687,529 by WANG, et al., entitled "UPSTREAM TIMING CONTROL MECHANISMS FOR NON-TERRESTRIAL NETWORKS," filed Jun. 20, 2018, assigned to the assignee hereof, and expressly incorporated by reference herein.

BACKGROUND

The following relates generally to wireless communications, and more specifically to upstream timing control mechanisms for non-terrestrial networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), orthogonal frequency division multiplexing (OFDM), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some examples of wireless communications systems may be non-terrestrial networks, which may utilize satellites and high-altitude platforms as relay devices in communications related to ground devices. In non-terrestrial networks, the propagation delay of wireless transmissions may be large compared to terrestrial wireless network transmissions. In some cases, techniques for reducing timing error related to wireless transmissions in terrestrial wireless network may be unsuitable in non-terrestrial networks and future solutions are desired.

SUMMARY

The described techniques relate to improved methods, systems, devices, and apparatuses that support upstream timing control mechanisms for non-terrestrial networks. Generally, the described techniques provide for a wireless communications system that may be a non-terrestrial network, which may include a base station (e.g., a gateway), a user equipment (UE), and a satellite in wireless communications with the base station and the UE, among other components. In some cases, the base station may be integrated or located on board of the satellite. The UE and the base station may perform a timing adjustment for an upstream transmission to decrease or eliminate a timing error associated with the upstream transmission. The UE may determine a timing adjustment for an upstream transmission, for example, based on satellite information associated with the satellite. The UE may transmit information over the upstream transmission using the timing adjustment.

The base station may receive the upstream transmission and determine a timing error associated with the upstream transmission. Based on the timing error, the base station may determine a timing adjustment for a second upstream transmission. The base station may transmit, to the UE, a timing command including the timing adjustment in a group control information message or a dedicated physical channel message. Alternatively, the base station may transmit the timing command in a medium access control (MAC) control element (CE). After the UE receives the timing command, the UE may transmit the second upstream transmission using the second timing adjustment. In this case, the base station may receive the second upstream transmission and determine that the timing error satisfies a threshold (e.g., round-trip time variation). By providing a more efficient coordination of timely communicating data between the base station, the UE, and the satellite, communication may be enhanced, and latency may be reduced for non-terrestrial networks.

A method of wireless communications is described. The method may include receiving, at a gateway in a non-terrestrial network, an upstream transmission from a UE in wireless communication with a satellite, determining, by the gateway, a timing adjustment for a second upstream transmission from the UE based at least in part on the upstream transmission from the UE, and transmitting, from the gateway to the UE in a group control information message or a dedicated physical channel message, a timing command indicating the timing adjustment for the second upstream transmission.

An apparatus for wireless communications is described. The apparatus may include a processor, memory in electronic communication with the processor, and instructions stored in the memory. The instructions may be executable by the processor to cause the apparatus to receive, at a gateway in a non-terrestrial network, an upstream transmission from a UE in wireless communication with a satellite, determine, by the gateway, a timing adjustment for a second upstream transmission from the UE based at least in part on the upstream transmission from the UE, and transmit, from the gateway to the UE in a group control information message or a dedicated physical channel message, a timing command indicating the timing adjustment for the second upstream transmission.

Another apparatus for wireless communications is described. The apparatus may include means for receiving, at a gateway in a non-terrestrial network, an upstream transmission from a UE in wireless communication with a satellite, means for determining, by the gateway, a timing adjustment for a second upstream transmission from the UE based at least in part on the upstream transmission from the UE, and means for transmitting, from the gateway to the UE in a group control information message or a dedicated physical channel message, a timing command indicating the timing adjustment for the second upstream transmission.

A non-transitory computer-readable medium storing code for wireless communications is described. The code may include instructions executable by a processor to receive, at a gateway in a non-terrestrial network, an upstream transmission from a UE in wireless communication with a satellite, determine, by the gateway, a timing adjustment for a second upstream transmission from the UE based at least in part on the upstream transmission from the UE, and transmit, from the gateway to the UE in a group control information message or a dedicated physical channel message, a timing command indicating the timing adjustment for the second upstream transmission.

Some examples of the method, apparatuses, and non-transitory computer-readable medium described herein may further include operations, features, means, or instructions for generating a configuration for the UE including a reference signal (RS) periodicity, an indication of a symbol of a slot, and an indication of frequency resources for the upstream transmission or the second upstream transmission, or both, and transmitting the configuration to the UE during a connection procedure with the UE, wherein transmitting the timing command is based at least in part on the configuration.

Some examples of the method, apparatuses, and non-transitory computer-readable medium described herein may further include operations, features, means, or instructions for periodically transmitting the timing command, the group control information message, or the dedicated physical channel message, or a combination thereof. In some examples of the method, apparatuses, and non-transitory computer-readable medium described herein, the configuration including the RS periodicity, the indication of the symbol of the slot, and the indication of frequency resources for the upstream transmission or the second upstream transmission, or both are preconfigured for the UE.

Some examples of the method, apparatuses, and non-transitory computer-readable medium described herein may further include operations, features, means, or instructions for determining that the UE was in a discontinuous reception (DRX) mode before receiving the configuration, where generating the configuration includes assigning, based on determining that the UE was in the DRX mode, a first gap period before a RS transmission and a second gap period after the RS transmission.

Some examples of the method, apparatuses, and non-transitory computer-readable medium described herein may further include operations, features, means, or instructions for determining a subcarrier spacing (SCS) based on the upstream transmission, where generating the configuration may be based on the SCS.

Some examples of the method, apparatuses, and non-transitory computer-readable medium described herein may further include operations, features, means, or instructions for assigning the group control information message to the UE and one or more additional UEs within a geographical area associated with a transmission beam of the satellite, the group control information message including a command for each UE associated with the group control information message, where transmitting the timing command may be based on assigning the group control information message to the UE.

Some examples of the method, apparatuses, and non-transitory computer-readable medium described herein may further include operations, features, means, or instructions for transmitting, to the UE, satellite information associated with the satellite based on a preconfigured schedule, the satellite information including an update rate, the update rate being associated with the satellite or a satellite beam and including one or more parameters. In some examples of the method, apparatuses, and non-transitory computer-readable medium described herein, the one or more parameters may include a velocity of the satellite relative to a point of a geographical area associated with a transmission beam of the satellite.

Some examples of the method, apparatuses, and non-transitory computer-readable medium described herein may further include operations, features, means, or instructions for receiving the second upstream transmission from the UE, determining that a timing error associated with the second upstream transmission satisfies a threshold, determining a second timing adjustment for a third upstream transmission based on the timing error associated with the second upstream transmission and transmitting, to the UE in the group control information message or the dedicated physical channel message, a second timing command indicating the second timing adjustment for the third upstream transmission.

Some examples of the method, apparatuses, and non-transitory computer-readable medium described herein may further include operations, features, means, or instructions for receiving the second upstream transmission from the UE, determining that a timing error associated with the second upstream transmission satisfies a threshold, determining a second timing adjustment for a third upstream transmission based on the timing error and transmitting, to the UE in medium access control (MAC) control element (CE), a second timing command indicating the second timing adjustment for the third upstream transmission.

A method of wireless communications is described. The method may include determining a timing adjustment for an upstream transmission based on satellite information associated with a satellite in wireless communication with the UE and a gateway in the non-terrestrial network, transmitting, to the gateway, data over the upstream transmission using the timing adjustment, receiving, from the gateway in a group control information message or a dedicated physical channel message, a second timing adjustment for a second upstream transmission based on the upstream transmission, and transmitting, to the gateway, the data over the second upstream transmission using the second timing adjustment or the timing adjustment based on the satellite information, or both.

An apparatus for wireless communications is described. The apparatus may include a processor, memory in electronic communication with the processor, and instructions stored in the memory. The instructions may be executable by the processor to cause the apparatus to determine a timing adjustment for an upstream transmission based on satellite information associated with a satellite in wireless communication with the UE and a gateway in the non-terrestrial network, transmit, to the gateway, data over the upstream transmission using the timing adjustment, receive, from the gateway in a group control information message or a dedicated physical channel message, a second timing adjustment for a second upstream transmission based on the upstream transmission, and transmit, to the gateway, the data over the second upstream transmission using the second timing adjustment or the timing adjustment based on the satellite information, or both.

Another apparatus for wireless communications is described. The apparatus may include means for determining a timing adjustment for an upstream transmission based on satellite information associated with a satellite in wireless communication with the UE and a gateway in the non-terrestrial network, means for transmitting, to the gateway, data over the upstream transmission using the timing adjustment, means for receiving, from the gateway in a group control information message or a dedicated physical channel message, a second timing adjustment for a second upstream transmission based on the upstream transmission, and means for transmitting, to the gateway, the data over the second upstream transmission using the second timing adjustment or the timing adjustment based on the satellite information, or both.

A non-transitory computer-readable medium storing code for wireless communications is described. The code may include instructions executable by a processor to determine a timing adjustment for an upstream transmission based on satellite information associated with a satellite in wireless communication with the UE and a gateway in the non-terrestrial network, transmit, to the gateway, data over the upstream transmission using the timing adjustment, receive, from the gateway in a group control information message or a dedicated physical channel message, a second timing adjustment for a second upstream transmission based on the upstream transmission, and transmit, to the gateway, the data over the second upstream transmission using the second timing adjustment or the timing adjustment based on the satellite information, or both.

Some examples of the method, apparatuses, and non-transitory computer-readable medium described herein may further include operations, features, means, or instructions for receiving a configuration during a connection procedure with the gateway, the configuration indicating timing resources and frequency resources for receiving timing adjustments from the gateway and decoding the control information message or the dedicated physical channel message based on the configuration, where receiving the second timing adjustment for the second upstream transmission may be based on decoding the control information message or the dedicated physical channel message.

Some examples of the method, apparatuses, and non-transitory computer-readable medium described herein may further include operations, features, means, or instructions for receiving, from at least one of the gateway or the satellite in wireless communications with the UE, the satellite information associated with the satellite at a first time and determining an update rate based on the satellite information, where determining the timing adjustment may be based on the update rate.

Some examples of the method, apparatuses, and non-transitory computer-readable medium described herein may further include operations, features, means, or instructions for updating a schedule timing for transmitting the second upstream transmission based on the update rate, where transmitting, to the gateway, the data over the second upstream transmission may be based on the updating.

In some examples of the method, apparatuses, and non-transitory computer-readable medium described herein, the satellite information may include a velocity of the satellite relative to a point of a geographical area associated with a transmission beam of the satellite.

Some examples of the method, apparatuses, and non-transitory computer-readable medium described herein may further include operations, features, means, or instructions for determining that the UE may be within a geographical area associated with a transmission beam of the satellite, where determining the update rate may be based on the UE determining that it may be within the geographical area associated with the transmission beam.

Some examples of the method, apparatuses, and non-transitory computer-readable medium described herein may further include operations, features, means, or instructions for receiving, from at least one of the gateway or the satellite in wireless communications with the UE, second satellite information associated with the satellite at a second time after the first time and determining, by the UE, a third timing adjustment for a third upstream transmission based on the second satellite information received at the second time, where transmitting, to the gateway, the data may be based on transmitting the data over the third upstream transmission using the third timing adjustment and a timing adjustment based at least in part on the update rate.

Some examples of the method, apparatuses, and non-transitory computer-readable medium described herein may further include operations, features, means, or instructions for receiving, from the gateway, a fourth timing adjustment based on the third upstream transmission using the third timing adjustment, where transmitting, to the gateway, the data may be based on transmitting the data over a fourth upstream transmission using the fourth timing adjustment.

In some examples of the method, apparatuses, and non-transitory computer-readable medium described herein, the second timing adjustment for the second upstream transmission is received in a medium access control (MAC) control element (CE). In some examples of the method, apparatuses, and non-transitory computer-readable medium described herein, the second timing adjustment for the second upstream transmission is received at a preconfigured frequency resource.

In some examples of the method, apparatuses, and non-transitory computer-readable medium described herein, determining the timing adjustment for the upstream transmission is performed autonomously by the UE. In some examples of the method, apparatuses, and non-transitory computer-readable medium described herein, the timing adjustment for the upstream transmission is based at least in part on an update rate and timing command received from the gateway.

Some examples of the method, apparatuses, and non-transitory computer-readable medium described herein may further include operations, features, means, or instructions for periodically receiving, from the gateway, a third command corresponding to a third timing adjustment for a corresponding third upstream transmission based on a subcarrier spacing (SCS) associated with the corresponding third upstream transmission.

Some examples of the method, apparatuses, and non-transitory computer-readable medium described herein may further include operations, features, means, or instructions for transmitting an RS to the gateway based on a RS periodicity preconfigured by the gateway, where receiving the second timing adjustment for the second upstream transmission may be further based on transmitting the RS to the gateway.

DETAILED DESCRIPTION

A wireless communications system may be a non-terrestrial network including a base station that may utilize a satellite (e.g., a non-geostationary satellite) to relay communications to UEs. Due to the mobility of the satellite, the communications may experience timing errors (e.g., variation in propagation delay). Some techniques for reducing the timing error related to wireless transmissions in terrestrial wireless network may be unsuitable in non-terrestrial networks. According to the techniques described herein, the base station and the UEs in wireless communications with the satellite may support timing control mechanisms for reducing the timing error due to the mobility of the UEs and the satellite.

A UE in wireless communications with the base station and a non-geostationary satellite may determine a first timing adjustment for an upstream transmission, for example, based on satellite information (e.g., an update rate, velocity of the satellite, propagation delay information or any combination thereof), which may be received from the base station and/or the non-geostationary satellite. The UE may transmit information over the upstream transmission using the timing adjustment. The base station may receive the upstream transmission and determine a timing error associated with the upstream transmission. Based on the timing error (e.g., round-trip time variation), a device, such as the base station, may determine a timing adjustment for a following upstream transmission for the UE. The timing adjustment may be indicated in a timing command that may be transmitted by the device (e.g., the base station) in a group control information message or a dedicated physical channel message, among other options. Alternatively, the base station may transmit the timing command in a medium access control (MAC) control element (CE). After the UE receives the timing command, the UE may transmit an upstream transmission using the timing adjustment indicated by the base station and the timing adjustment based on the satellite. In this case, the timing error with the subsequent upstream transmission may be lower compared to the initial upstream transmission from the UE. By providing an improved timing control mechanism for reducing timing error of upstream transmissions between the base station, the UE, and the satellite, communication may be enhanced, and latency may be reduced for non-terrestrial networks.

Aspects of the disclosure are initially described in the context of a wireless communications system. Aspects of the disclosure are also illustrated by and described with reference to a process flow. Aspects of the disclosure are further illustrated by and described with reference to apparatus diagrams, system diagrams, and flowcharts that relate to upstream timing control mechanisms for non-terrestrial networks.

Figure 1:
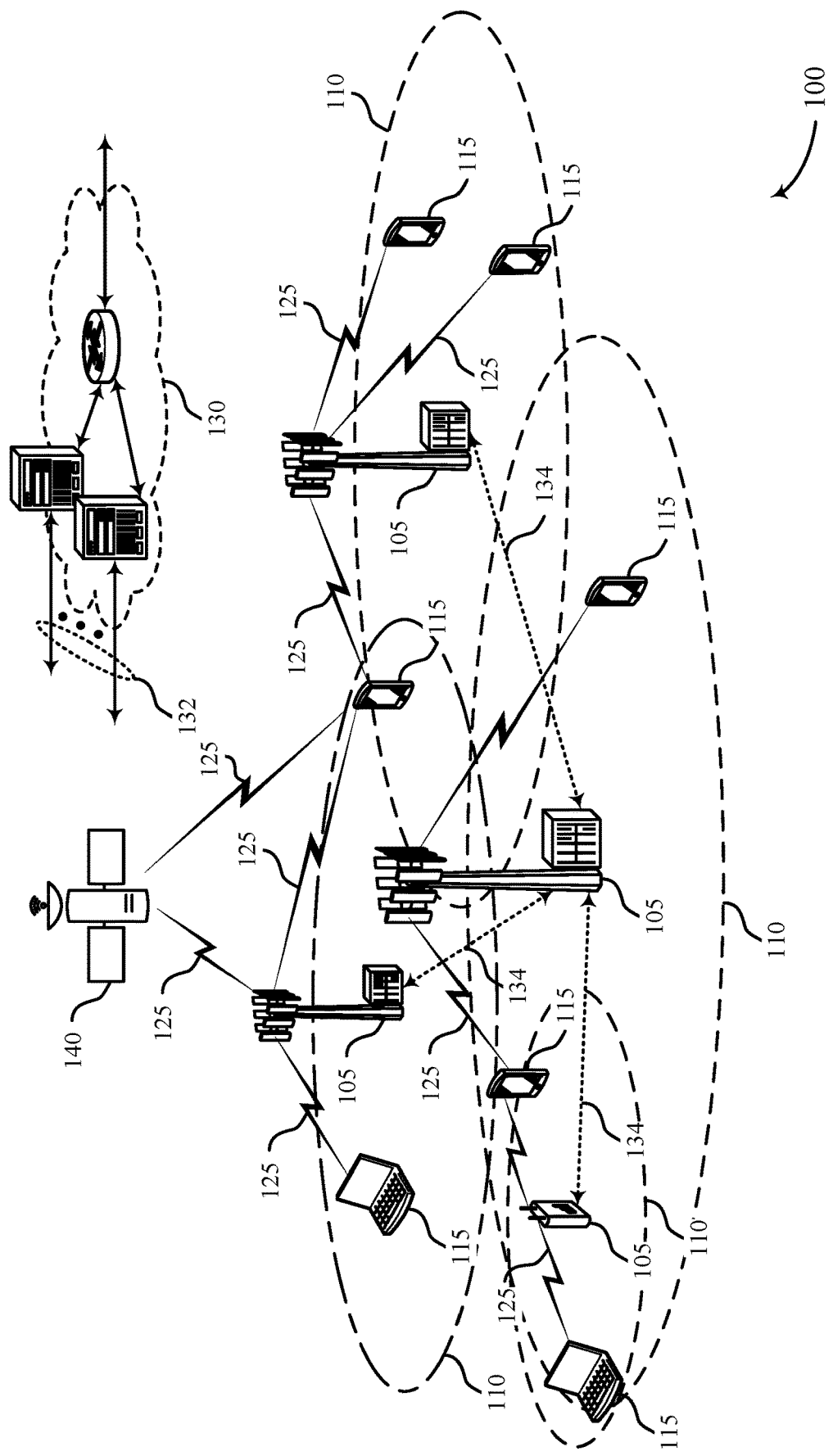
FIGS. 1 and 2 illustrate examples of a wireless communications system that supports upstream timing control mechanisms for non-terrestrial networks in accordance with aspects of the present disclosure.

FIG. 1 illustrates an example of a wireless communications system 100 that supports upstream timing control mechanisms for non-terrestrial networks in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include upstream transmissions from a UE 115 to a base station 105, or downstream transmissions from a base station 105 to a UE 115. Downstream transmissions may also be called forward link transmissions while upstream transmissions may also be called reverse link transmissions.

The geographic coverage area 110 for a base station 105 may be divided into sectors each making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier) or a satellite beam, and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downstream transmissions, upstream transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix (CP) prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downstream or upstream (e.g., in an FDD mode), or be configured to carry downstream and upstream communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downstream carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downstream CCs and one or more upstream CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, the wireless communications system 100 may be or be related to a terrestrial network. Some examples of terrestrial networks may include NR systems, for example, including base stations 105 and UE s 115. Within an NR system, upstream transmissions (e.g., CP-OFDM or DFT-S-OFDM waveforms) may arrive at a base station 105 from a UE 115 within an interval time, for example, within a CP duration. For subcarrier spacing of 120 kHz, the CP duration may be approximately 0.59 µs. Additionally, subcarrier spacing for mmW communications within Ka band such as, downstream transmissions between approximately 20 GHz and 30 GHz may be greater compared to upstream transmissions. For example, the subcarrier spacing greater than 120 kHz may improve communication reliability due to frequency error as a result of Doppler. In this example, a subcarrier spacing greater than 120 kHz may result in a CP duration of 0.25 µs.

Having upstream transmissions in a network (e.g., a terrestrial network) arrive at a base station within the CP duration allows signals from different UEs to arrive at the base station while being orthogonal to each other. That is, signals from different UEs will not interfere with each other allowing each signal to arrive at the base station. However, these techniques that provide upstream timing control for terrestrial networks may be ineffective for non-terrestrial networks.

In some examples, the wireless communications system may additionally, or alternatively be or be related to a non-terrestrial network. For example, base stations 105 may utilize the satellite 140 to relay communications to UEs 115. Due to the mobility of the satellite 140 and distance from the satellite 140 to the UEs 115, the communications may experience upstream timing errors (e.g., downstream timing tracking error, variation in propagation delay). For example, the satellite 140 may be a non-geostationary satellite that may orbit UEs 115 from 600 km and travel at a speed of approximately 7.6 km/s. As a result, the round-trip time (e.g., an update rate) between the satellite 140 and the UEs 115 may change as much as 50 µs per second.

For example, assuming that an upstream timing is ideal at time t (e.g., without any timing adjustment applied to the time t), approximately 10 ms later the upstream timing error may be approximately 0.5 µs. As a result, the round-trip time for the satellite 140 may be approximately 30 ms, and a timing advance command calculated based on upstream transmission at time t may be off by 1.5 µs when it arrives at a UE 115. To compensate for the upstream timing error, base station 105 (also referred to herein as "a gateway") may provide a timing command to the UEs 115 for upstream transmissions. The UEs 115 may receive the timing command and transmit an upstream transmission to the base station 105 using a timing adjustment indicated in the timing command.

Figure 2:
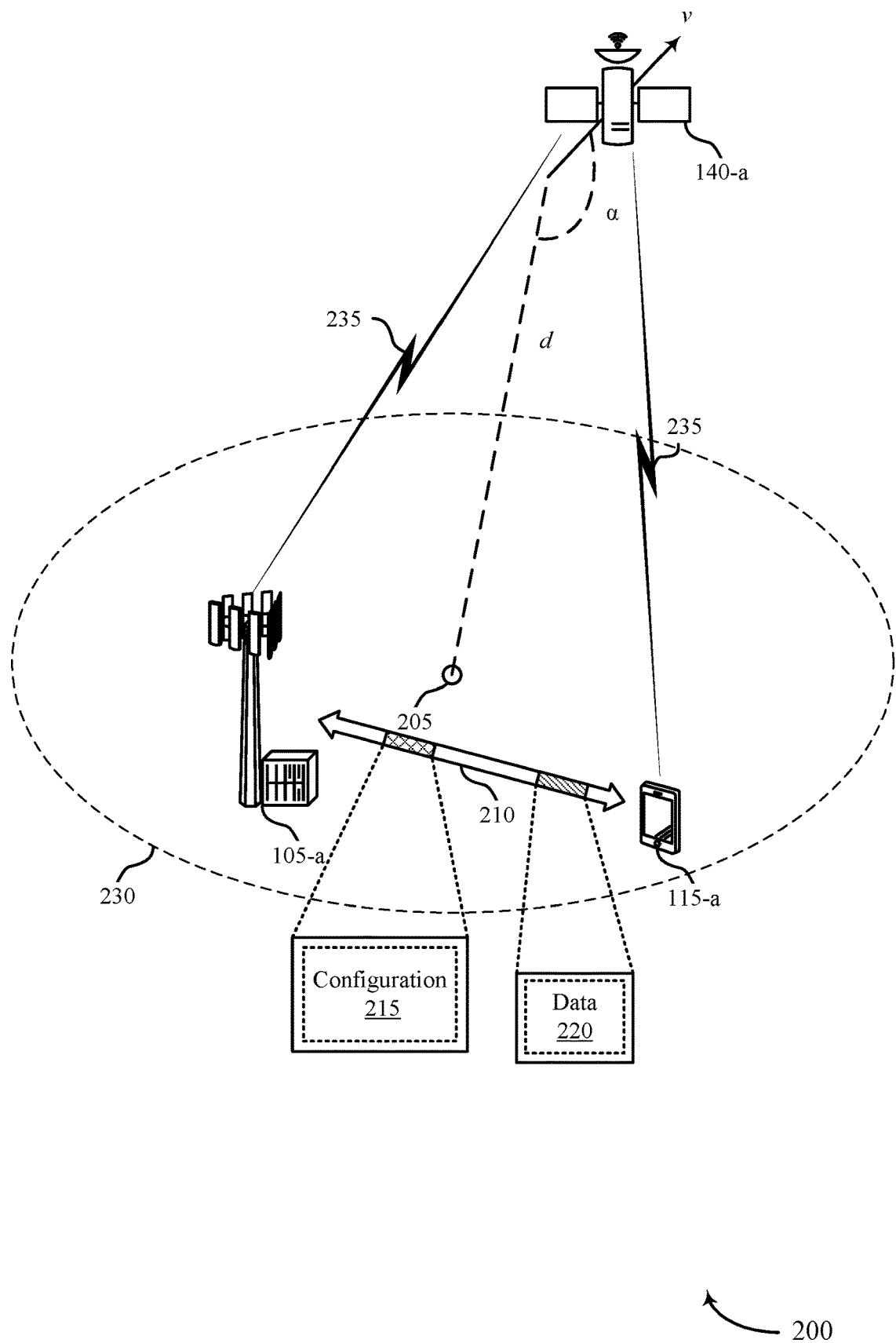

FIG. 2 illustrates an example of a wireless communications system 200 that supports upstream timing control mechanisms for non-terrestrial networks in accordance with aspects of the present disclosure. In some examples, the wireless communications system 200 may implement aspects of the wireless communications system 100. The wireless communications system 200 may include a base station 105-a, a UE 115-a, and a satellite 140-a, which may be examples of the corresponding devices described with reference to FIG. 1. For example, the wireless communications system 200 may be a non-terrestrial network, which may include a base station 105-a, a UE 115-a, and a satellite 140-a. The satellite 140-a may relay communications between base stations (e.g., base station 105-a) and mobile terminals (e.g., UE 115-a). The base station 105-a may also be referred to herein as a gateway. The geographical area associated with a transmission beam of the satellite 140-a may be called a beam footprint 230 and UE 115-a may communicate with the satellite 140-a when the UE 115-a is located within the beam footprint 230.

The base station 105-a may perform a communication procedure (e.g., an RRC procedure, such as a cell acquisition procedure, random access procedure, RRC connection procedure, RRC configuration procedure) with the UE 115-a. The base station 105-a may be configured with multiple antennas, which may be used for directional or beamformed transmissions. As part of the communication procedure, the base station 105-a may establish a bi-directional communication link 210 for communication with the UE 115-a. Additionally, or alternatively, as part of the communication procedure, the base station 105-a may configure the UE 115-a with configuration 215 (e.g., time and frequency resources, a reference signal periodicity, an indication of a symbol of a slot for transmitting reference signals) via RRC signaling.

In some cases, the UE 115-a may provide one or more UE capabilities (e.g., related to itself and/or other UEs) to the base station 105-a, so that the base station 105-a may configure a UE (e.g., the UE 115-a) based on the UE capability. The base station 105-a, as part of the communication procedure, may provide the configuration 215 for receiving timing adjustments from the base station 105-a for transmitting data 220 in upstream transmissions. In some cases, the timing adjustment for an upstream transmission from the UE 115-a may be based on a combination of a timing adjustment determined by the UE 115-a (e.g., using open-loop timing control) as well as a timing adjustment determined by the base station 105-a (e.g., using closed-loop timing control). The UE 115-a and the base station 105-a may perform the timing adjustments continuously or iteratively until an upstream timing error for an upstream transmission satisfies a threshold.

In some examples, to compensate for an upstream timing error, the UE 115-a may autonomously and/or continuously perform an open-loop timing control for upstream transmission. For example, the UE 115-a may estimate a round-trip time variation rate (e.g., an update rate) to determine a timing adjustment of an upstream transmission for reducing or eliminating a corresponding upstream timing error of the upstream transmission. In an example, the UE 115-a may determine a round-trip time variation rate for an upstream transmission using both global positioning system (GPS) information and ephemeris information (e.g., orbital information) associated with the satellite 140-a and determine a timing adjustment based on the round-trip time variation rate. Additionally, or alternatively, without GPS information, the UE 115-a may determine its geo-location and timing using the ephemeris information related to (e.g., broadcasted by) the base station 105-a and/or the satellite 140-a to estimate the round-trip time variation rate.

The satellite 140-a may generate satellite information (e.g., ephemeris information) associated with communications between the satellite 140-a, the UE 115-b, and the base station 105-a. For example, the satellite 140-a may determine a propagation delay associated with transmissions between the satellite 140-a, the UE 115-b, and the base station 105-a. In some cases, the propagation delay may be based on the distance d from the satellite 140-a to the point 205 (e.g., center) of the beam footprint 230. In other cases, the propagation delay may be a factor of the distance d, which may correspond to the round-trip distance between the base station 105-a and the satellite 140-a. Additionally or alternatively, the propagation delay may be an estimated round trip delay or a round-trip time between the UE 115-a and the base station 105-a, which may be based at least in part on d and/or 2d. It should be noted that the distance d may not reflect the precise distance from the satellite 140-a to the UE 115-a. For example, the UE 115-a may be located at an edge of the beam footprint 230 and may be a different distance from the satellite 140-a than d. However, such a difference in distance may be insignificant compared to d. Thus, the distance d may be a sufficient representation of the distance from the satellite 140-a to the UE 115-a.

The satellite 140-a may transmit, via wireless communication links 235, the satellite information to the base station 105-a and/or the UE 115-a, which may be located within the beam footprint 230. In some cases, the satellite 140-a may update and transmit the satellite information to the base station 105-a and/or the UE 115-a at a preconfigured schedule (e.g., an update rate). The preconfigured schedule may be based on a velocity of the satellite 140-a. For example, the velocity of the satellite 140-a may result in a maximum round-trip time variation rate of 50 μs per second. That is, for every second of movement of the satellite 140-a, the round-trip time of communications between the satellite 140-a and the UE 115-a, for example, may vary by 50 μs. The round-trip time variation rate may also vary based on the movement of the satellite (e.g., orbit). In such instances, the satellite 140-a may update the satellite information multiple times every second. Additionally, or alternatively, the base station 105-a may transmit the satellite information to the UE 115-a via the bi-directional communication link 210, for example as part of the configuration 215. In some cases, the base station 105-a may transmit the satellite information to the UE 115-a based on the preconfigured schedule, for example, the update rate of the satellite 140-a.

The satellite information may also include the velocity of the satellite 140-a. The velocity of the satellite 140-a may, in some cases, be defined by or relate to the following expression $v \times \cos(\alpha)$, where a is the angle between the vector of velocity v and the vector of distance d. The UE 115-a may use the velocity of the satellite 140-a to determine the round-trip time variation rate (i.e., perform the open-loop timing control). In some cases, the UE 115-a may determine the round-trip time variation rate using the velocity of the satellite 140-a based at least in part on the UE 115-a being located relative to the point 205 of the beam footprint 230. In some examples, using the velocity of the satellite 140-a, the round-trip time variation rate may be defined by the following expression $-2v \times \cos(\alpha)/c$, where α is the angle between the vector of velocity v and the vector of distance d, and c is the speed of light. As such, if an upstream transmission is scheduled to be transmitted at time $t_0$ with a timing adjustment $t_a$, the actual transmission time by the UE 115-a may be $t_0+t_a$. For a subsequent upstream transmission scheduled to be transmitted at time $t_a+\Delta t$ without a new timing adjustment provided by the base station 105-a, the actual transmission time by the UE 115-a may be $t_a+\Delta t \times (-2v \times \cos(\alpha)/c)$.

In some cases, after the UE 115-a determines a timing adjustment for an upstream transmission using open-loop timing control a residual timing error may exist. This residual timing error may be a result of downstream timing tracking error or errors in parameters of the open-loop timing control (e.g., erroneous timing or location estimation of the UE 115-a and the satellite 140-a). In addition, only using the velocity of the satellite 140-a relative to the point 205 of the beam footprint 230 may result in a round-trip time variation rate (e.g., update rate) of approximately 5 µs. To compensate for the residual timing error, the base station 105-a may perform closed-loop timing control. That is, the base station 105-a may determine a timing error based on upstream transmissions from the UE 115-a, determine a timing adjustment based on the upstream transmission, and transmit a timing command indicating the timing adjustment for the UE 115-a to apply to following upstream transmissions.

In some cases, the base station 105-a may transmit a timing command using a control element, such as a medium access control (MAC) control element (CE). For example, the base station 105-a may indicate a timing adjustment using one or more bits (e.g., 6 bits) of a MAC header. The timing command may be indicated in the MAC-CE according to the following expression: $T_c \times (T_A - 31) \times 16 \times 64 / 2^\mu$, where µ is log 2(subcarrier spacing/15 kHz) and $T_c$ is $1/(30.72 \, e^6 \times 64)$. For example, at a subcarrier spacing of 120 kHz using the above expression, the CP duration may be 0.59 µs. If the base station 105-a is to provide timing commands to the UE 115-a to ensure an upstream timing error less than half a CP (e.g., 0.20 µs), then in an example implementation the base station 105-a may need to transmit at least 25 timing commands per second for a subcarrier spacing of 120 kHz. To meet such requirements, the base station 105-a may configure a reference signal periodicity (e.g., sounding reference signal (SRS) periodicity) for the UE 115-a such that the base station 105-a may determine a timing error for upstream transmissions from the UE 115-a both efficiently and effectively. For example, if the UE 115-a has a subcarrier spacing of 120 kHz and a residual round-trip time variation rate of 5 µs/s, the reference signal periodicity may be less than 40 ms.

The base station 105-a may indicate the reference signal periodicity in the configuration 215 as part of the communication procedure. In some cases, the base station 105-a may periodically or aperiodically update and transmit the reference signal periodicity to the UE 115-a. The reference signal periodicity may, in some examples, be based on whether the UE 115-a is in a DRX mode before receiving the reference signal periodicity. In the case that the UE 115-a is in DRX mode prior to receiving the reference signal periodicity, the base station 105-a may assign a first gap period before a reference signal transmission and a second gap period after the reference signal transmission. A reference signal transmission may include the UE 115-a transmitting a sounding reference signal, a cell-specific reference signal, a positioning reference signal, a synchronization signal, a channel state information reference signal, etc., which the base station 105-a may use to determine timing adjustments for upstream transmission from the UE 115-a.

When the UE 115-a is in the DRX mode and in RRC-idle or RRC-connected, the base station 105-a may transmit downlink control information in certain time and frequency resources (e.g., fixed symbols). Between these time and frequency resources, the UE 115-a may enter a lower-power state, also referred to as "sleep mode," so as to reduce power consumption and increase battery life for the UE 115-a. In RRC-idle or RRC-connected, the UE 115-a may wakeup once every number of symbols to receive a downstream transmission from the base station 105-a and/or the satellite 140-a. The gap periods allocated prior to and following a reference signal transmission may be benefit the base station 105-a by reducing or eliminating interferences between the UE 115-a transmission and a transmission from another neighboring UE.

In some cases, the base station 105-a may be in communication with multiple UEs (not shown), which may not all have constant downstream data. In this case, the base station 105-a may provide, to the UE 115-a and other UEs within the beam footprint 230 a timing command including a timing adjustment for upstream transmissions in a group control information message or a dedicated physical channel message. For example, the base station 105-a may assign the group control information message to the UE 115-a and one or more additional UEs within the beam footprint 230. The group control information message may include a timing command for each UE associated with the group control information message for time adjusting an upstream transmission. The base station 105-a may also organize the configuration 215 per UE or per UE group to reduce blind decoding. For example, the base station 105-a may configure the periodicity of the group control message or the dedicated physical channel message for a group of UEs to reduce blind decoding performed by UEs within the beam footprint 230. That is, the base station 105-a may transmit the group control message or the dedicated physical channel message within a fixed frequency resource location (e.g., downlink control information (DCI) candidate in a search space) at preconfigured periodical time locations. The periodicity of the timing control message may be adjacent to or within a symbol period of the sounding reference signal.

In an example, the UE 115-a may determine a timing adjustment for an upstream transmission, for example, based on satellite information associated with the satellite 140-a in wireless communication with the UE 115-a and the base station 105-a, or using one or more additionally techniques described herein. The UE 115-a may transmit data 220 over the upstream transmission using the timing adjustment to the base station 105-a. The base station 105-a may receive the upstream transmission and determine a timing error associated with the upstream transmission. Based on the timing error, the base station 105-a may determine a timing adjustment for a second upstream transmission from the UE 115-a. The base station 105-a may transmit, to the UE 115-a, a timing command including the timing adjustment in a group control information message or a dedicated physical channel message, which the UE 115-a may receive. Alternatively, the base station 105-a may transmit the timing command in a MAC-CE. In some cases, the base station 105-a may transmit the timing command in MAC-CE for fine time tuning and at less frequency. The UE 115-a may decode the timing command and identify the timing adjustment. The UE 115-a may transmit, to the base station 105-a, the data 220 over a second upstream transmission using the second timing adjustment in addition to the timing adjustment based on the satellite information. For instance, if an upstream transmission is scheduled to be transmitted at time $t_0$ with a timing adjustment $t_a$, the actual transmission time by the UE 115-a may be $t_0+t_a$. For a subsequent upstream transmission scheduled to be transmitted at time $t_a+\Delta t$ with a new timing adjustment $t_b$ provided by the base station 105-a, the actual transmission time by the UE 115-a may be $t_a+t_b+\Delta t \times(-2v\times\cos(\alpha)/c)$. The timing component $\Delta t \times(-2v\times\cos(\alpha)/c)$ is the open-loop adjustment and the component $t_b$ is the closed-loop adjustment provided by the base station 105-a. By providing a more efficient coordination of timely communicating data between the base station 105-a, the UE 115-a, and the satellite 140-a, communication may be enhanced, and latency reduced between the base station 105-a, the UE 115-a, and the satellite 140-a.

Figure 3:
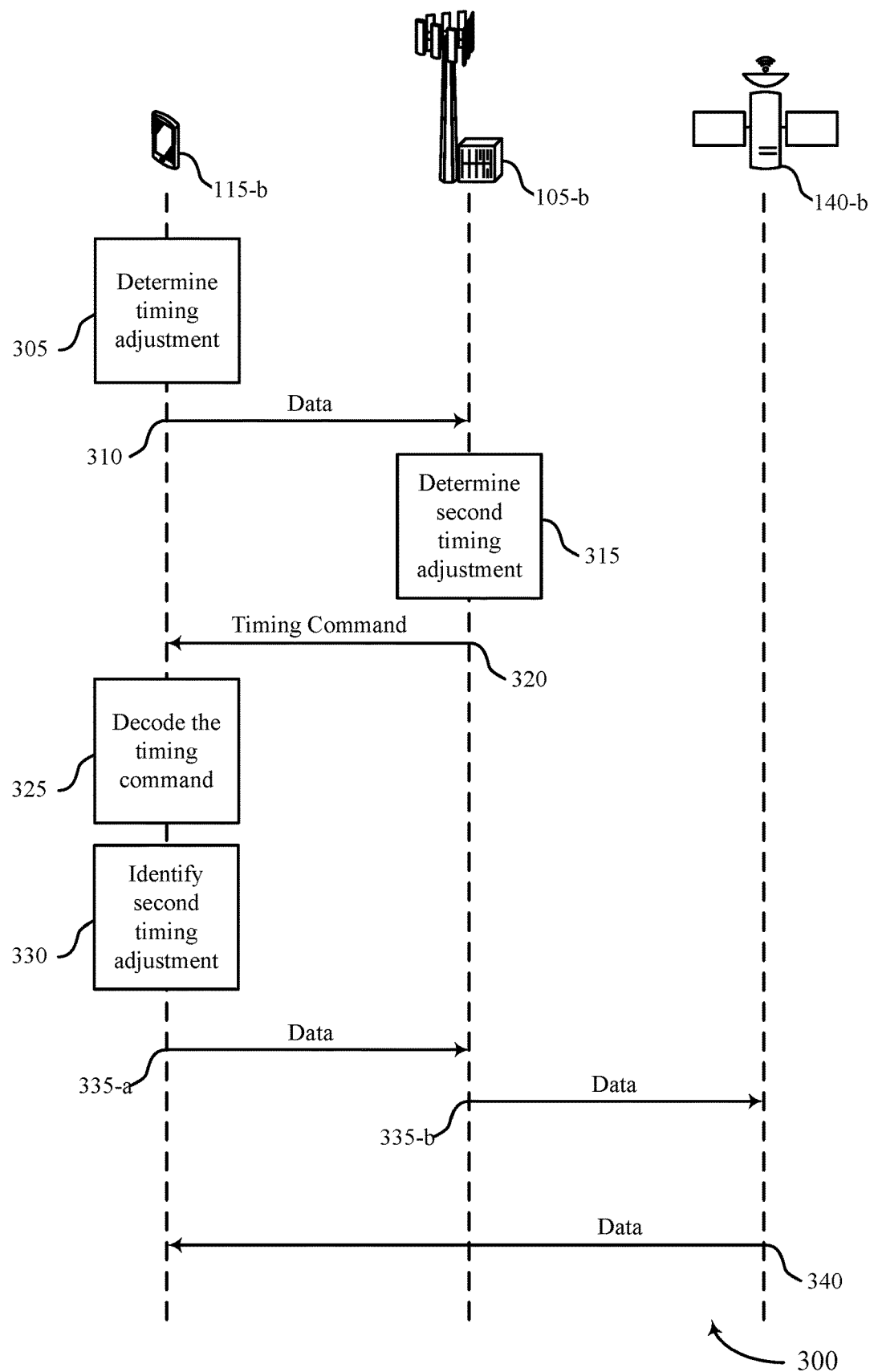
FIG. 3 illustrates an example of a process flow that supports upstream timing control mechanisms for non-terrestrial networks in accordance with aspects of the present disclosure.

FIG. 3 illustrates an example of a process flow 300 that supports upstream timing control mechanisms for non-terrestrial networks in accordance with aspects of the present disclosure. Base station 105-b, UE 115-b, and satellite 140-b may be examples of the corresponding devices described with reference to FIGS. 1 and 2. In some examples, the process flow 300 may implement aspects of wireless communications system 100 and 200. For example, the base station 105-b, UE 115-b, and satellite 140-b may support upstream timing control mechanisms. In some examples, an upstream timing control mechanism may include the UE 115-b performing an open-loop timing control for determining and/or updating timing adjustments for upstream transmissions. Additionally, the upstream timing control mechanism may include the base station 105-b performing a closed-loop timing control for determining and/or updating the timing adjustment of the UE 115-b described with reference to FIGS. 1 and 2.

In the following description of the process flow 300, the operations between the base station 105-b, the UE 115-b, and the satellite 140-b may be transmitted in a different order than the exemplary order shown, or the operations performed by the base station 105-b, the UE 115-b, and the satellite 140-b may be performed in different orders or at different times. Certain operations may also be left out of the process flow 300, or other operations may be added to the process flow 300.

In some examples, the process flow 300 may commence with the base station 105-b establishing a connection with the UE 115-b (e.g., performing a cell acquisition procedure, a random access procedure, an RRC connection procedure, an RRC configuration procedure).

At 305, the UE 115-b may determine a timing adjustment. For example, the UE 115-b may determine a timing adjustment for an upstream transmission. In some examples, the UE 115-b may determine the timing adjustment based on satellite information associated with the satellite 140-b in wireless communication with the UE 115-b and the base station 105-b. The satellite information may include a velocity of the satellite 140-b relative to a point of a geographical area associated with a transmission beam of the satellite 140-b. Additionally, or alternatively, the UE 115-b may determine the timing adjustment for the upstream transmission based on determining a round-trip time variation rate (e.g., an update rate). In some cases, the round-trip time variation rate may be determined by the UE 115-b based on determining that it is within a geographical area associated with a transmission beam of the satellite 140-b.

At 310, the UE 115-b may transmit data to the base station 105-b. For example, the UE 115-b may transmit data on the upstream transmission using the determined timing adjustment.

At 315, the base station 105-b may determine a second timing adjustment. For example, the base station 105-b may receive the upstream transmission from the UE 115-b and perform a closed-loop timing control to determine the second timing adjustment for a second upstream transmission for the UE 115-b. In some cases, determining the second timing adjustment may be based on determining that a timing error associated with the upstream transmission satisfies a threshold. The second timing adjustment may coordinate an upstream transmission timing closer to an ideal upstream timing such that the UE 115-b may be capable of both transmitting upstream transmission to the satellite 140-b via the base station 105-b at an accurate time and receiving downstream transmissions from the satellite 140-b appropriately (e.g., without missing a downstream transmission from the satellite 140-b due to a timing error).

At 320, the base station 105-b may transmit a timing command to the UE 115-b indicating the second timing adjustment. In some examples, the base station 105-b may transmit the timing command in a group control information message or a dedicated physical channel message. The group control information message may be a downlink control information message that may also be transmitted on a physical channel, which may in some cases be a dedicated physical channel (e.g., a physical control channel). In some examples, the timing command may be transmitted on a preconfigured resource element (e.g., timing and frequency resource). For example, the base station 105-b may transmit the timing command using a resource element that spans one symbol by one-subcarrier within a control region of a slot. A physical control channel may be multiplexed on a carrier or a subcarrier, for example, using one or more techniques, such as TDM techniques, FDM techniques, or hybrid TDM-FDM techniques. In some examples, the group control information transmitted on a physical control channel may be distributed between different control regions in a cascaded manner (e.g., between a common control region or common search space and one or more UE-specific control regions or UE-specific search spaces). The base station 105-b may map the resource element for the physical control channel. In some examples, the base station 105-a may configure a periodicity of the group control information message or the dedicated physical channel message for a group of UEs to reduce blind decoding performed by UEs within a beam footprint. That is, the base station 105-b may transmit the group control message or dedicated physical channel message within a fixed frequency resource location (e.g., DCI candidate in a search space) at preconfigured periodical time locations. The periodicity of the timing control message may be fitted with the periodicity of the sounding reference signal.

At 325, the UE 115-b may decode the timing command. For example, the UE 115-b may receive the timing command and establish a size for a control region and locations of common and UE-specific search spaces. Within each search space, the UE 115-b may identify possible control channel element (CCE) candidates where the base station 105-b may have transmitted the group control information message. The UE 115-b may identify the CCE candidate where the group control information message is transmitted, for example, by identifying a CRC bit associated with a CCE candidate matching a radio network temporary identifier (RNTI) of the base station 105-b. Once the UE 115-b has identified the correct CCE candidate, the UE 115-b may decode the timing command. At 330, the UE 115-b may identify the second timing adjustment, for example, based on decoding time timing command.

At 335-*a*, the UE 115-*b* may transmit, to the base station 105-*b*, data on a second upstream transmission using the second timing adjustment or the timing adjustment based on the satellite information, or both. For example, the UE 115-*b* may transmit, to the base station 105-*b*, the data over the second upstream transmission using the second timing adjustment and the timing adjustment based on the satellite information. At 335-*b*, the base station 105-*b* may transmit and/or forward the data received from the UE 115-*b* to the satellite 140-*b*. At 340, the satellite 140-*b* may transmit data to the UE 115-*b*.

Figure 4:
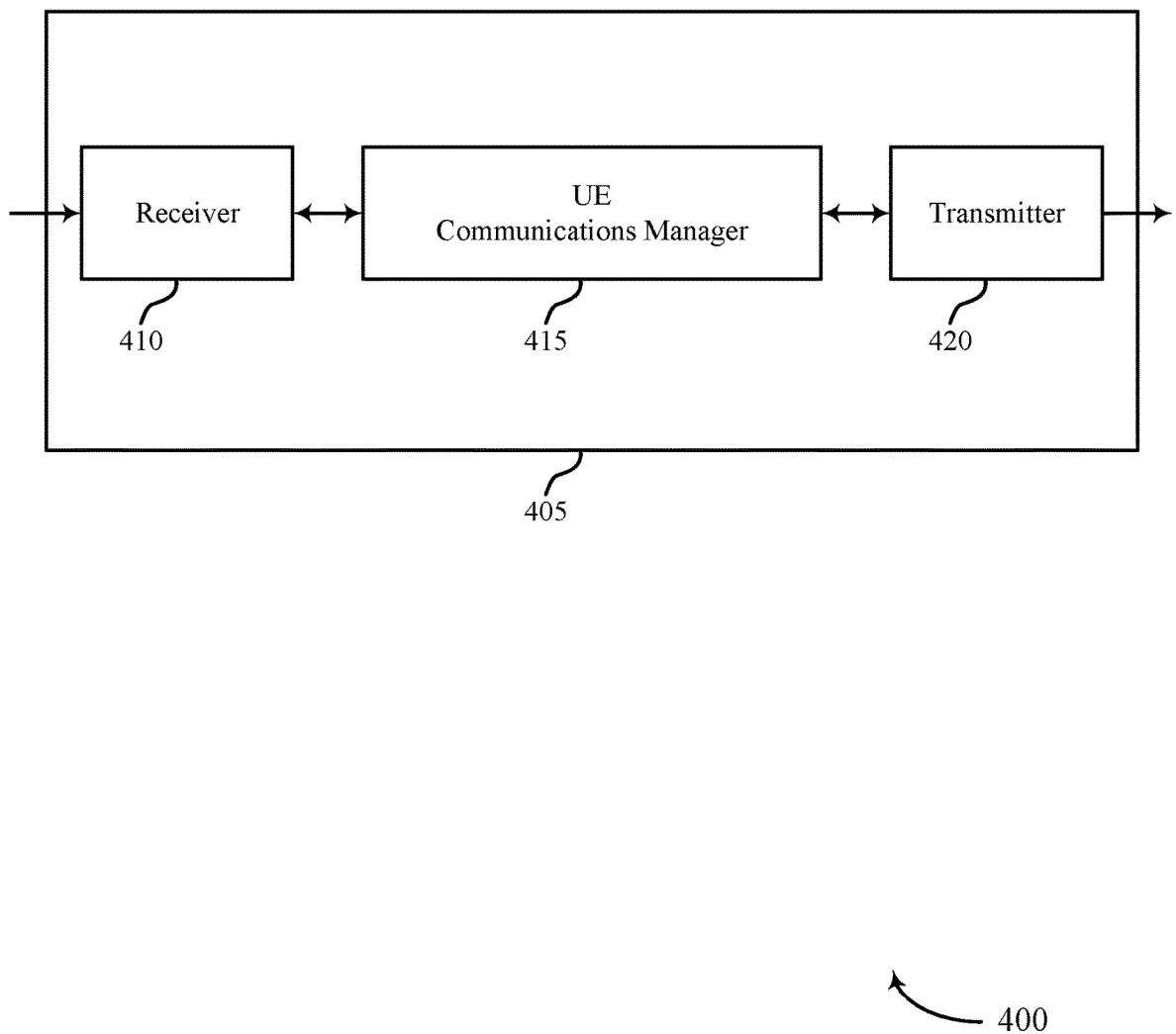
FIGS. 4 and 5 show block diagrams of devices that support upstream timing control mechanisms for non-terrestrial networks in accordance with aspects of the present disclosure.

FIG. 4 shows a block diagram 400 of a device 405 that supports upstream timing control mechanisms for non-terrestrial networks in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to upstream timing control mechanisms for non-terrestrial networks, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may determine a timing adjustment for an upstream transmission based on satellite information associated with a satellite in wireless communication with the UE and a gateway in the non-terrestrial network, transmit, to the gateway, data over the upstream transmission using the timing adjustment, receive, from the gateway in a group control information message or a dedicated physical channel message, a second timing adjustment for a second upstream transmission based on the upstream transmission, and transmit, to the gateway, receive, from the gateway in a group control information message or a dedicated physical channel message, a second timing adjustment for a second upstream transmission based on the upstream transmission. The UE communications manager 415 may be an example of aspects of the UE communications manager 710 described herein.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
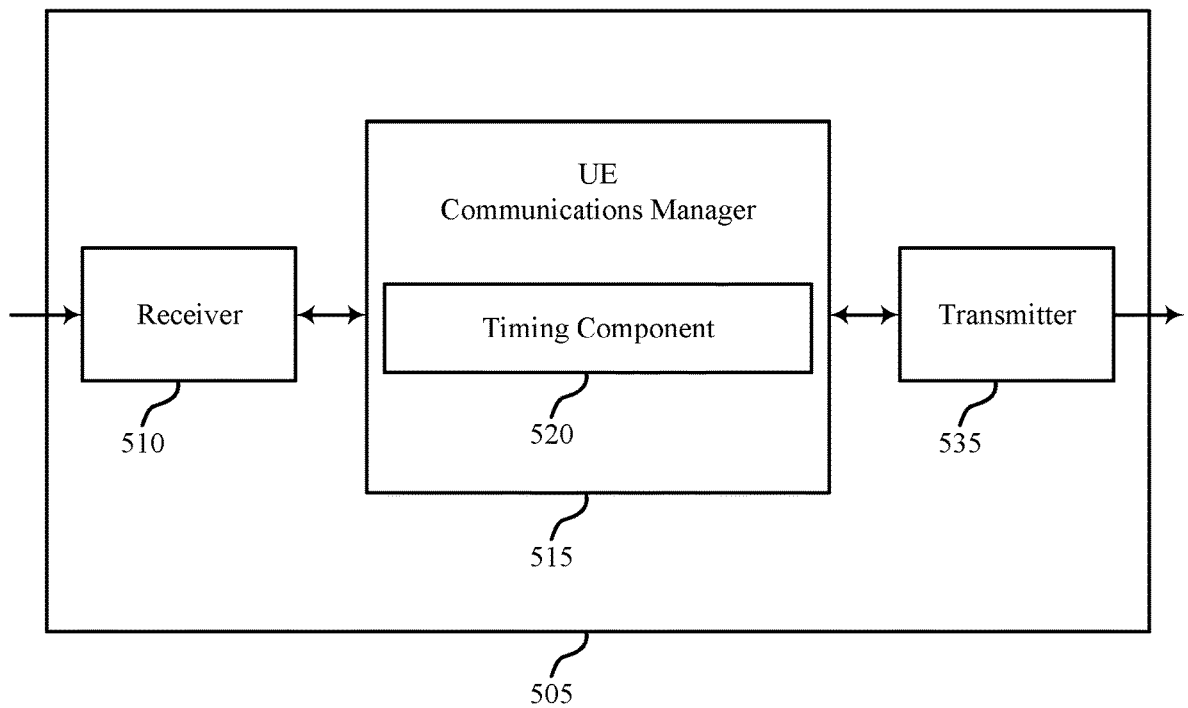

FIG. 5 shows a block diagram 500 of a device 505 that supports upstream timing control mechanisms for non-terrestrial networks in accordance with aspects of the present disclosure. The device 505 may be an example of aspects of a device 405 or a UE 115 as described herein. The device 505 may include a receiver 510, a UE communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to upstream timing control mechanisms for non-terrestrial networks, etc.). Information may be passed on to other components of the device 505. The receiver 510 may be an example of aspects of the transceiver 720 described with reference to FIG. 7. The receiver 510 may utilize a single antenna or a set of antennas.

The receiver 510 may receive, from a gateway in a group control information message or a dedicated physical channel message, a second timing adjustment for a second upstream transmission based on an upstream transmission. The receiver 510 may receive a configuration during a connection procedure with the gateway, the configuration indicating timing resources and frequency resources for receiving timing adjustments from the gateway.

The receiver 510 may receive, from at least one of the gateway or a satellite in wireless communications with the UE, the satellite information associated with the satellite at a first time. The receiver 510 may receive, from at least one of the gateway or the satellite in wireless communications with the UE, second satellite information associated with the satellite at a second time after the first time. The receiver 510 may receive, from the gateway, a fourth timing adjustment based on a third upstream transmission using a third timing adjustment, where transmitting, to the gateway, data is based on transmitting the data over a fourth upstream transmission using the fourth timing adjustment. The receiver 510 may periodically receive, from the gateway, a third command corresponding to the third timing adjustment for a corresponding third upstream transmission based on an SCS associated with the corresponding third upstream transmission. The receiver 510 may periodically receive the timing command, the group control information message, or the dedicated physical channel message, or a combination thereof.

The UE communications manager 515 may be an example of aspects of the UE communications manager 415 as described herein. The UE communications manager 515 may include a timing component 520. The UE communications manager 515 may be an example of aspects of the UE communications manager 710 described herein. The timing component 520 may determine a timing adjustment for the upstream transmission based on the satellite information associated with the satellite in wireless communication with the UE and the gateway in the non-terrestrial network.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas. The transmitter 535 may transmit, to the gateway, data over the upstream transmission using the timing adjustment and transmit, to the gateway, the data over the second upstream transmission using the second timing adjustment or the timing adjustment based on the satellite information, or both.

Figure 6:
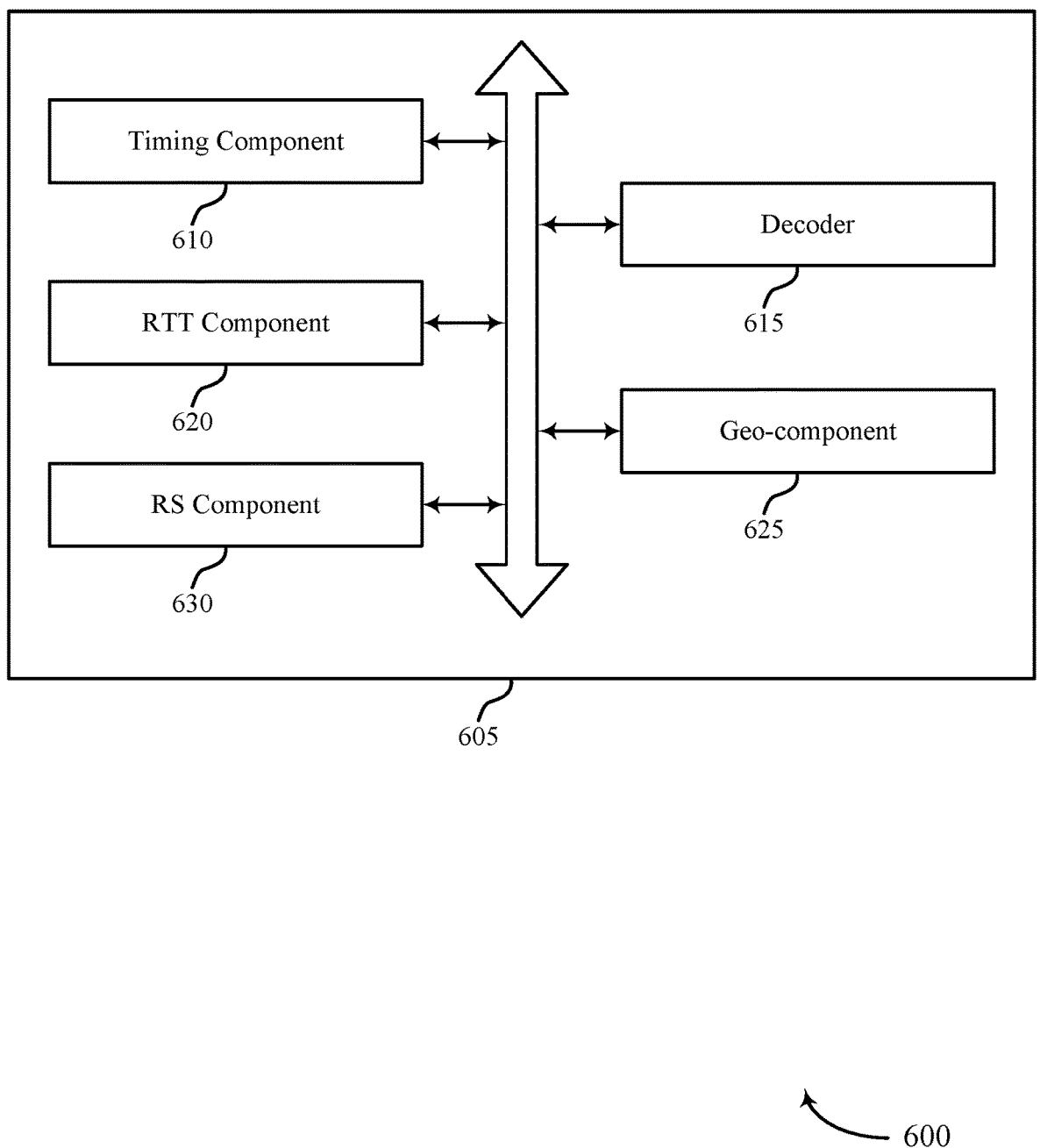
FIG. 6 shows a block diagram of a user equipment (UE) communications manager that supports upstream timing control mechanisms for non-terrestrial networks in accordance with aspects of the present disclosure.

FIG. 6 shows a block diagram 600 of a UE communications manager 605 that supports upstream timing control mechanisms for non-terrestrial networks in accordance with aspects of the present disclosure. The UE communications manager 605 may be an example of aspects of a UE communications manager 415, a UE communications manager 515, or a UE communications manager 710 described herein. The UE communications manager 605 may include a timing component 610, a decoder 615, a round trip time (RTT) component 620, a geo-component 625, and an RS component 630. Each of these modules may communicate, directly or indirectly, with one another (e.g., via one or more buses).

The timing component 610 may determine a timing adjustment for an upstream transmission based on satellite information associated with a satellite in wireless communication with the UE and a gateway in the non-terrestrial network. In some examples, the timing component 610 may update a schedule timing for transmitting a second upstream transmission based on an update rate, where transmitting, to the gateway, the data over the second upstream transmission is based on the updating. In some examples, the timing component 610 may determine, by the UE, a third timing adjustment for a third upstream transmission based on the second satellite information received at a second time, where transmitting, to the gateway, the data is based on transmitting the data over the third upstream transmission using the third timing adjustment and a timing adjustment based at least in part on the update rate.

The decoder 615 may decode a control information message or a dedicated physical channel message based on a configuration, where receiving the second timing adjustment for the second upstream transmission is based on decoding the control information message or the dedicated physical channel message. In some examples, the configuration including the RS periodicity, the indication of the symbol of the slot, and the indication of frequency resources for the upstream transmission or the second upstream transmission, or both may be preconfigured for the UE. For example, the periodicity and/or time and frequency resources within a period may be preconfigured to the UE. The RTT component 620 may determine the update rate based on the satellite information, where determining the timing adjustment is based on the update rate. The geo-component 625 may determine that the UE is within a geographical area associated with a transmission beam of the satellite, where determining the update rate is based on the UE determining that it is within the geographical area associated with the transmission beam. The RS component 630 may transmit an RS to the gateway based on a RS periodicity preconfigured by the gateway, where receiving the second timing adjustment for the second upstream transmission is further based on transmitting the RS to the gateway.

Figure 7:
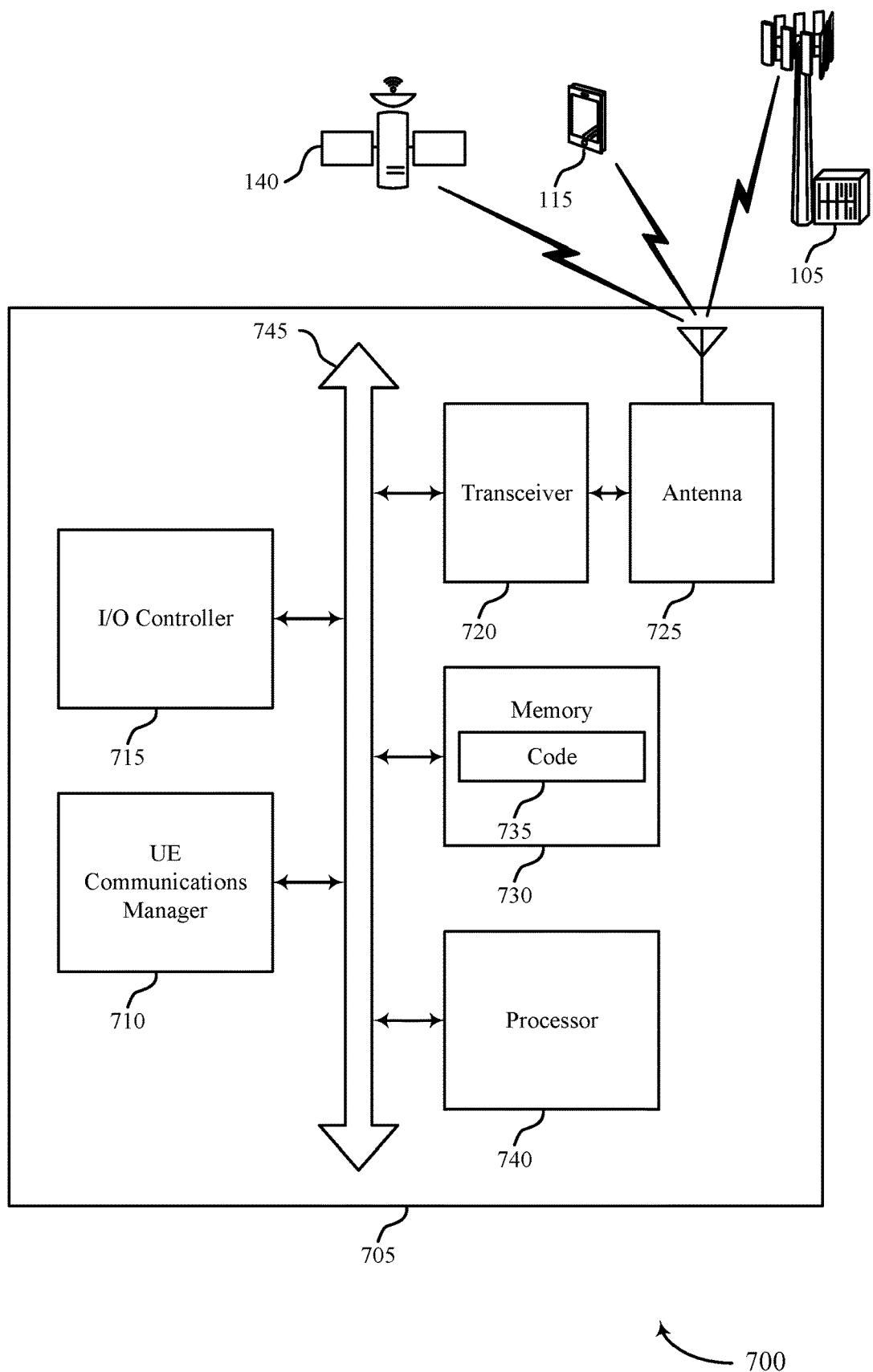
FIG. 7 shows a diagram of a system including a device that supports upstream timing control mechanisms for non-terrestrial networks in accordance with aspects of the present disclosure.

FIG. 7 shows a diagram of a system 700 including a device 705 that supports upstream timing control mechanisms for non-terrestrial networks in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may determine a timing adjustment for an upstream transmission based on satellite information associated with a satellite in wireless communication with the UE and a gateway in the non-terrestrial network, transmit, to the gateway, data over the upstream transmission using the timing adjustment, receive, from the gateway in a group control information message or a dedicated physical channel message, a second timing adjustment for a second upstream transmission based on the upstream transmission, and transmit, to the gateway, the data over the second upstream transmission using the second timing adjustment or the timing adjustment based on the satellite information, or both.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting upstream timing control mechanisms for non-terrestrial networks).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
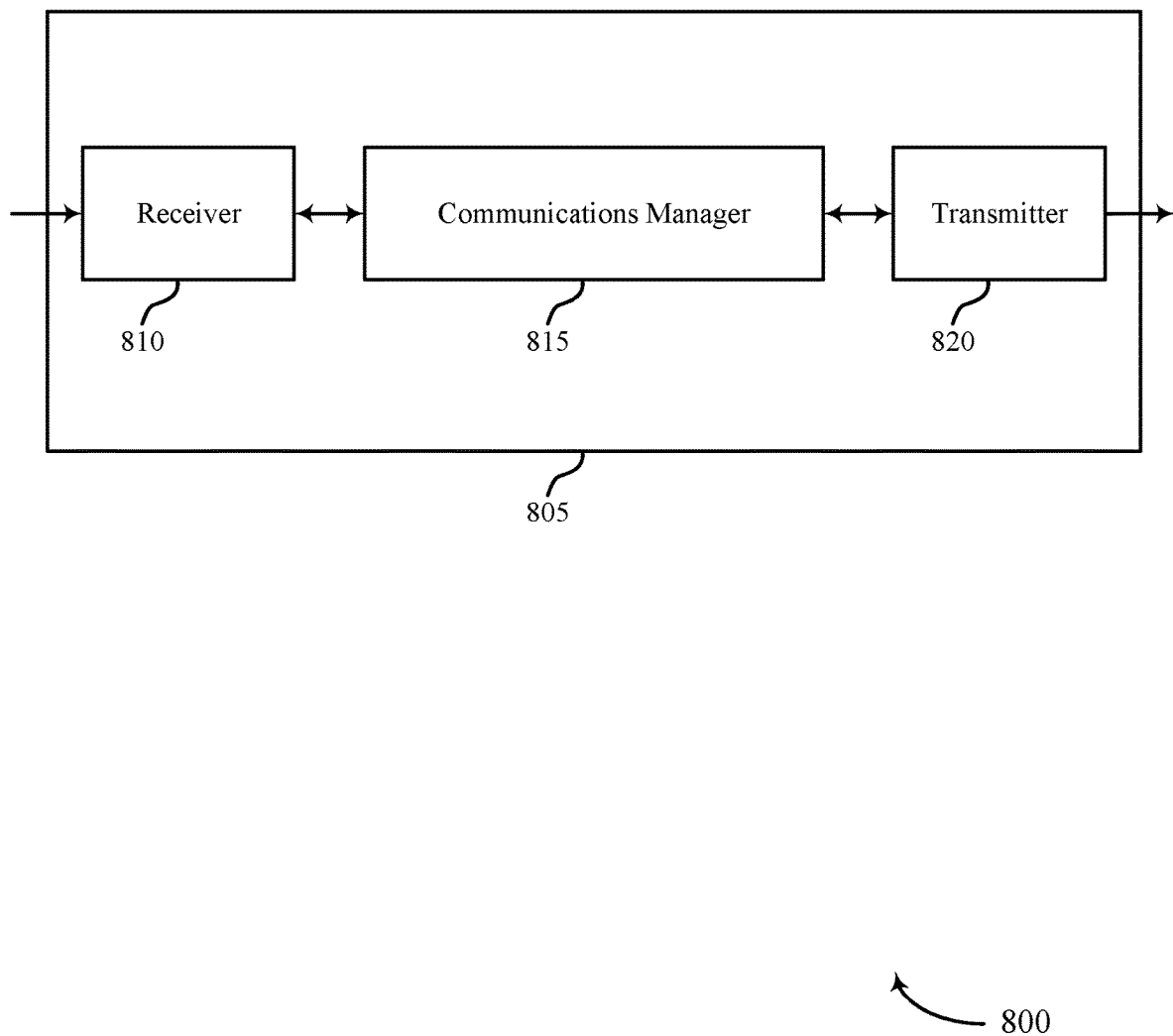
FIGS. 8 and 9 show block diagrams of devices that support upstream timing control mechanisms for non-terrestrial networks in accordance with aspects of the present disclosure.

FIG. 8 shows a block diagram 800 of a device 805 that supports upstream timing control mechanisms for non-terrestrial networks in accordance with aspects of the present disclosure. The device 805 may be an example of aspects of a gateway or a base station as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to upstream timing control mechanisms for non-terrestrial networks, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive an upstream transmission from a UE in wireless communication with a satellite, determine a timing adjustment for a second upstream transmission from the UE based on the upstream transmission from the UE, and transmit, to the UE in a group control information message or a dedicated physical channel message, a timing command indicating the timing adjustment for the second upstream transmission. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
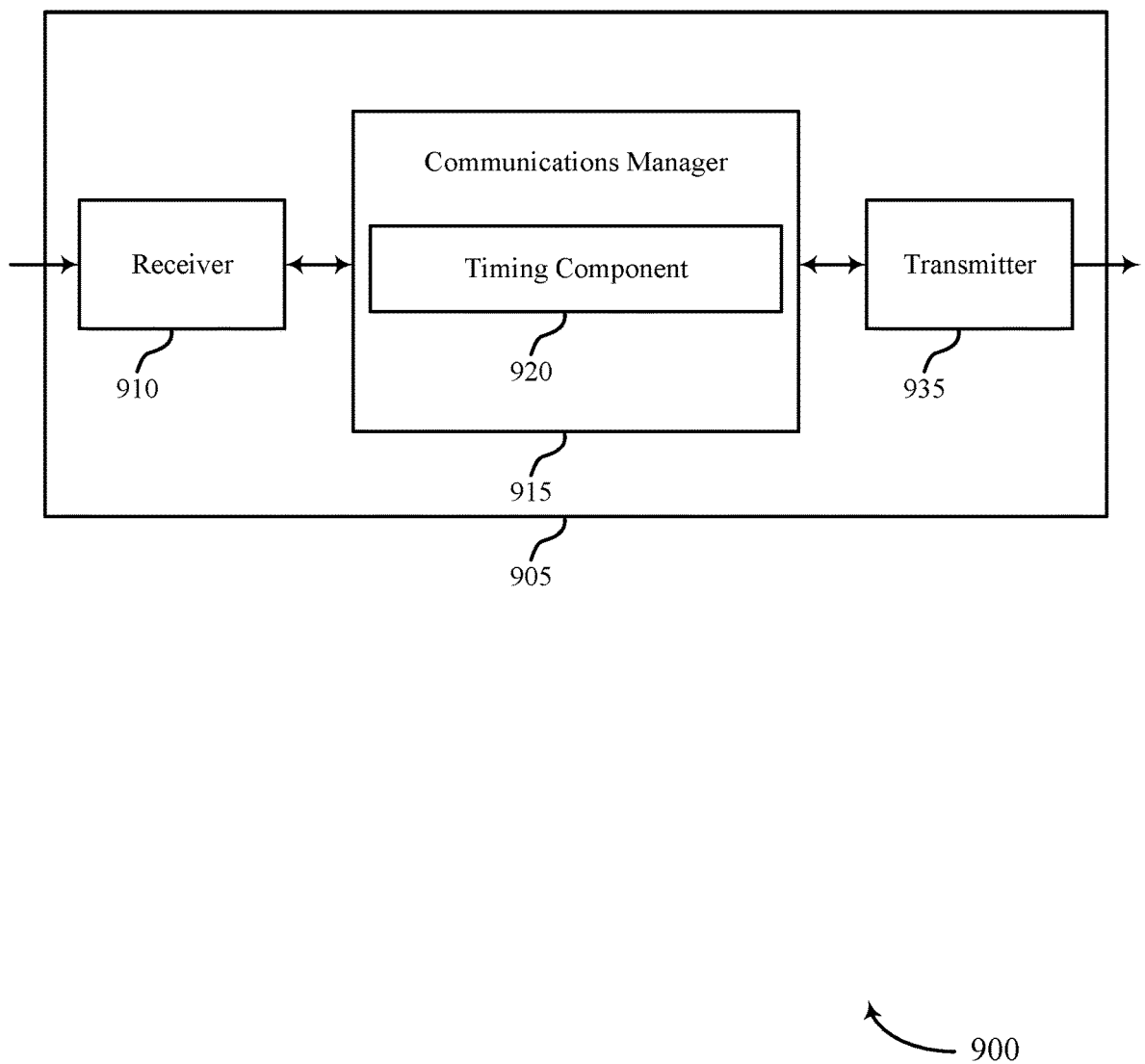

FIG. 9 shows a block diagram 900 of a device 905 that supports upstream timing control mechanisms for non-terrestrial networks in accordance with aspects of the present disclosure. The device 905 may be an example of aspects of a device 805 or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to upstream timing control mechanisms for non-terrestrial networks, etc.). Information may be passed on to other components of the device 905. The receiver 910 may receive an upstream transmission from a UE in wireless communication with a satellite. In some examples, the receiver 910 may receive a second upstream transmission from the UE. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a timing component 920. The communications manager 915 may be an example of aspects of the communications manager 1110 described herein. The timing component 920 may determine a timing adjustment for a second upstream transmission from the UE based on the upstream transmission from the UE.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas. The transmitter 935 may transmit, to the UE in a group control information message or a dedicated physical channel message, a timing command indicating the timing adjustment for the second upstream transmission. The transmitter 935 may periodically transmit the timing command, the group control information message, or the dedicated physical channel message, or a combination thereof.

The transmitter 935 may transmit, to the UE in a group control information message or a dedicated physical channel message, a timing command indicating the timing adjustment for the second upstream transmission. In some examples, the transmitter 935 may transmit the configuration to the UE during a connection procedure with the UE, where transmitting the timing command is based on the configuration. In some examples, the transmitter 935 may transmit, to the UE, satellite information associated with the satellite based on a preconfigured schedule, the satellite information including an update rate, the update rate being associated with the satellite or a satellite beam and including one or more parameters. In some examples of the method, apparatuses, and non-transitory computer-readable medium described herein, the one or more parameters may include a velocity of the satellite relative to a point of a geographical area associated with a transmission beam of the satellite. In some examples, the transmitter 935 may transmit, to the UE in the group control information message or the dedicated physical channel message, a second timing command indicating the second timing adjustment for the third upstream transmission. In some examples, the transmitter 935 may transmit, to the UE in MAC-CE, a second timing command indicating the second timing adjustment for the third upstream transmission.

Figure 10:
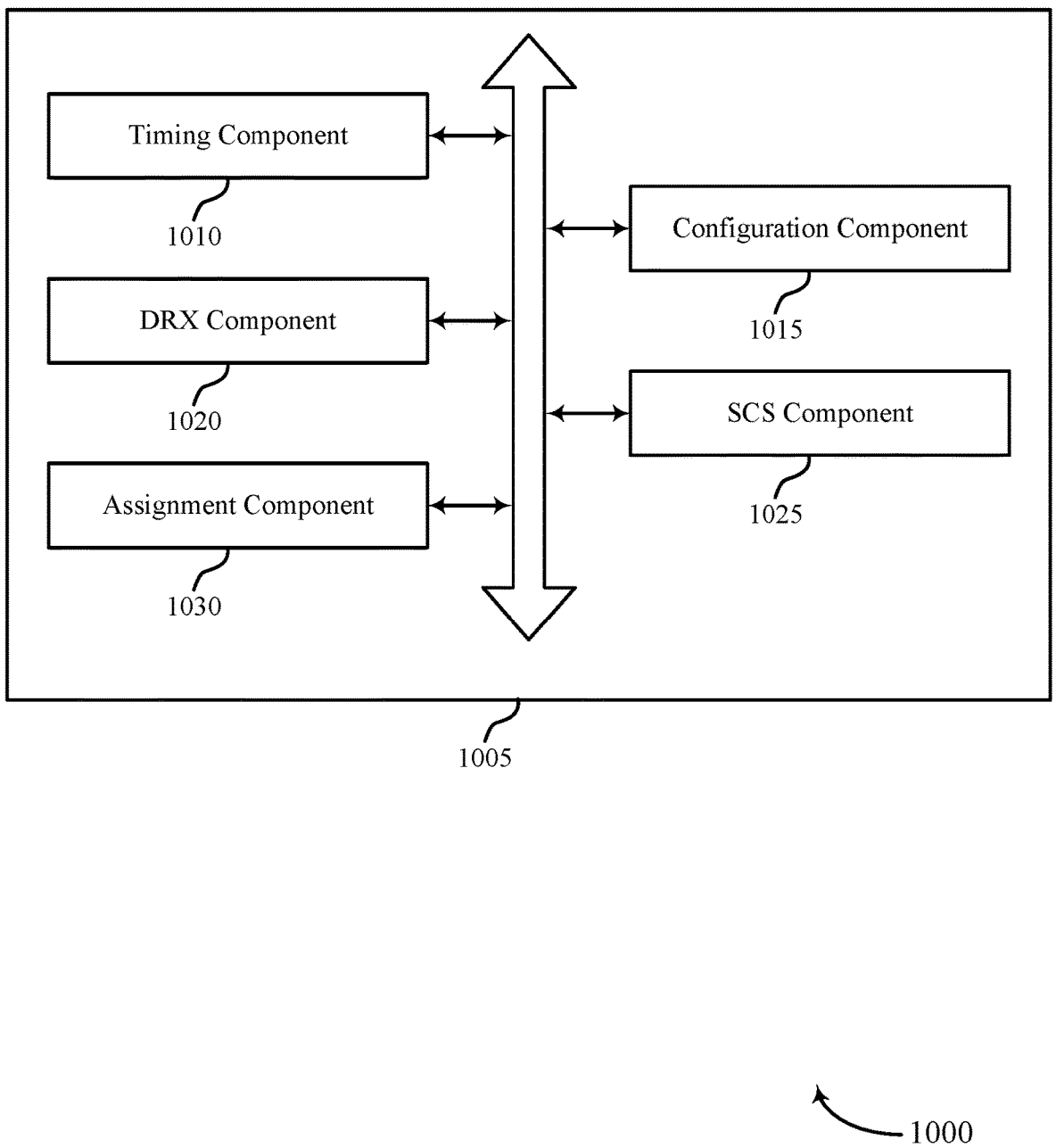
FIG. 10 shows a block diagram of a communications manager that supports upstream timing control mechanisms for non-terrestrial networks in accordance with aspects of the present disclosure.

FIG. 10 shows a block diagram 1000 of a communications manager 1005 that supports upstream timing control mechanisms for non-terrestrial networks in accordance with aspects of the present disclosure. The communications manager 1005 may be an example of aspects of a communications manager 815, a communications manager 915, or a communications manager 1110 described herein. The communications manager 1005 may include a timing component 1010, a configuration component 1015, a DRX component 1020, an SCS component 1025, and an assignment component 1030. Each of these modules may communicate, directly or indirectly, with one another (e.g., via one or more buses).

The timing component 1010 may determine a timing adjustment for a second upstream transmission from the UE based on the upstream transmission from the UE. In some examples, the timing component 1010 may determine that a timing error associated with the second upstream transmission satisfies a threshold. In some examples, the timing component 1010 may determine a second timing adjustment for a third upstream transmission based on the timing error associated with the second upstream transmission. In some examples, the timing component 1010 may determine a second timing adjustment for a third upstream transmission based on the timing error.

The configuration component 1015 may generate a configuration for the UE including a RS periodicity, an indication of a symbol of a slot, and an indication of frequency resources for the upstream transmission or the second upstream transmission, or both. The DRX component 1020 may determine that the UE was in a DRX mode before receiving the configuration, where generating the configuration includes assigning, based on determining that the UE was in the DRX mode, a first gap period before a RS transmission and a second gap period after the RS transmission. In some examples, the configuration including the RS periodicity, the indication of the symbol of the slot, and the indication of frequency resources for the upstream transmission or the second upstream transmission, or both are preconfigured for the UE. For example, the periodicity and/or time and frequency resources within a period may be preconfigured to the UE.

The SCS component 1025 may determine an SCS based on the upstream transmission, where generating the configuration is based on the SCS. The assignment component 1030 may assign the group control information message to the UE and one or more additional UEs within a geographical area associated with a transmission beam of the satellite. In some examples, the group control information message may include a command (e.g., timing command) for each UE associated with the group control information message.

Figure 11:
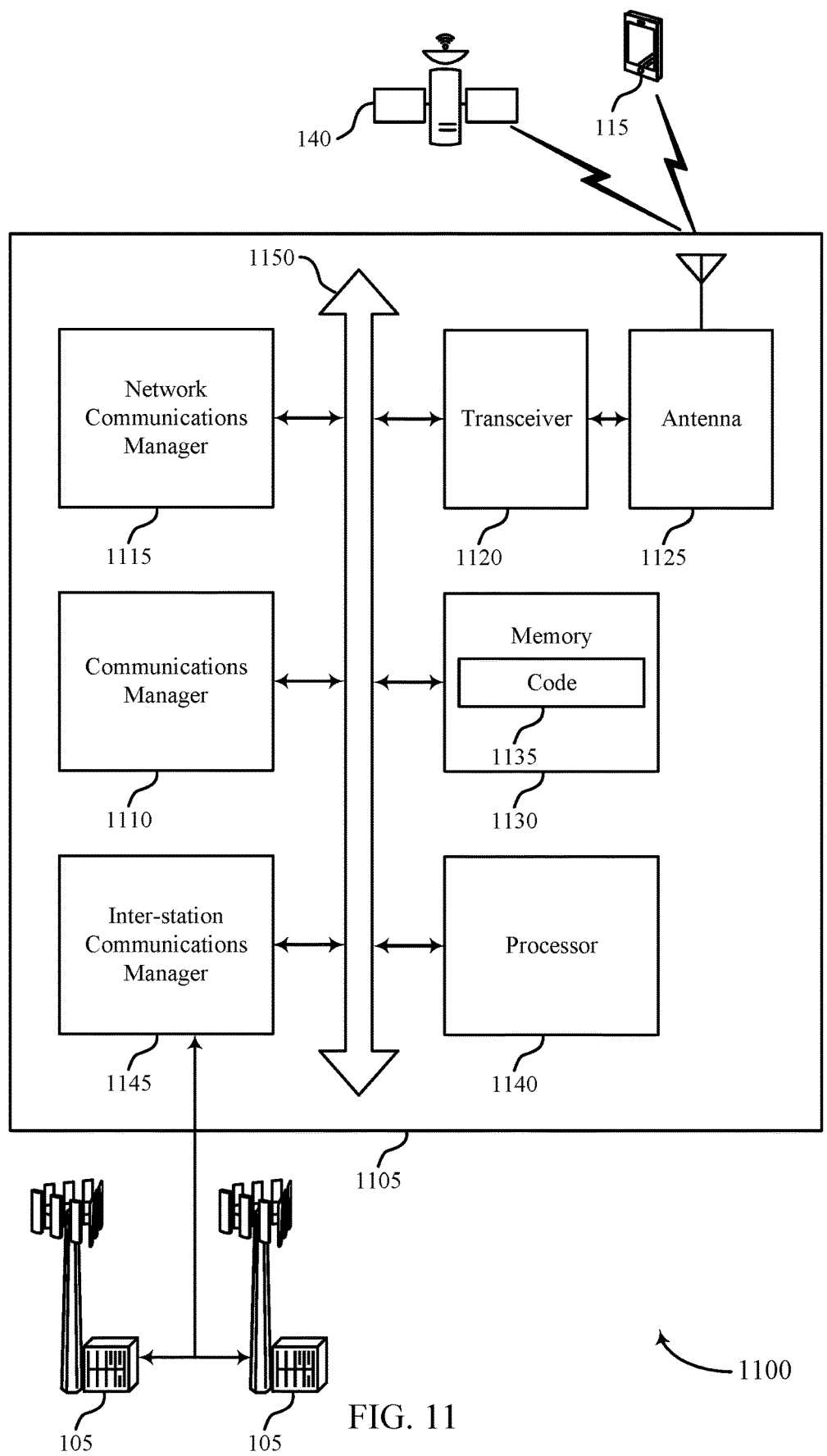
FIG. 11 shows a diagram of a system including a device that supports upstream timing control mechanisms for non-terrestrial networks in accordance with aspects of the present disclosure.

FIG. 11 shows a diagram of a system 1100 including a device 1105 that supports upstream timing control mechanisms for non-terrestrial networks in accordance with aspects of the present disclosure. The device 1105 may be an example of or include the components of device 805, device 905, a gateway and/or a base station as described herein. The device 1105 may include components for bi-directional voice and data communications including components for transmitting and receiving communications, including a communications manager 1110, a network communications manager 1115, a transceiver 1120, an antenna 1125, memory 1130, and a processor 1140. These components may be in electronic communication via one or more buses (e.g., bus 1150).

The communications manager 1110 may receive an upstream transmission from a UE in wireless communication with a satellite, determine a timing adjustment for a second upstream transmission from the UE based on the upstream transmission from the UE, and transmit, to the UE in a group control information message or a dedicated physical channel message, a timing command indicating the timing adjustment for the second upstream transmission.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting upstream timing control mechanisms for non-terrestrial networks).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The inter-station communications manager 1145 may manage communications with base stations 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

Figure 12:
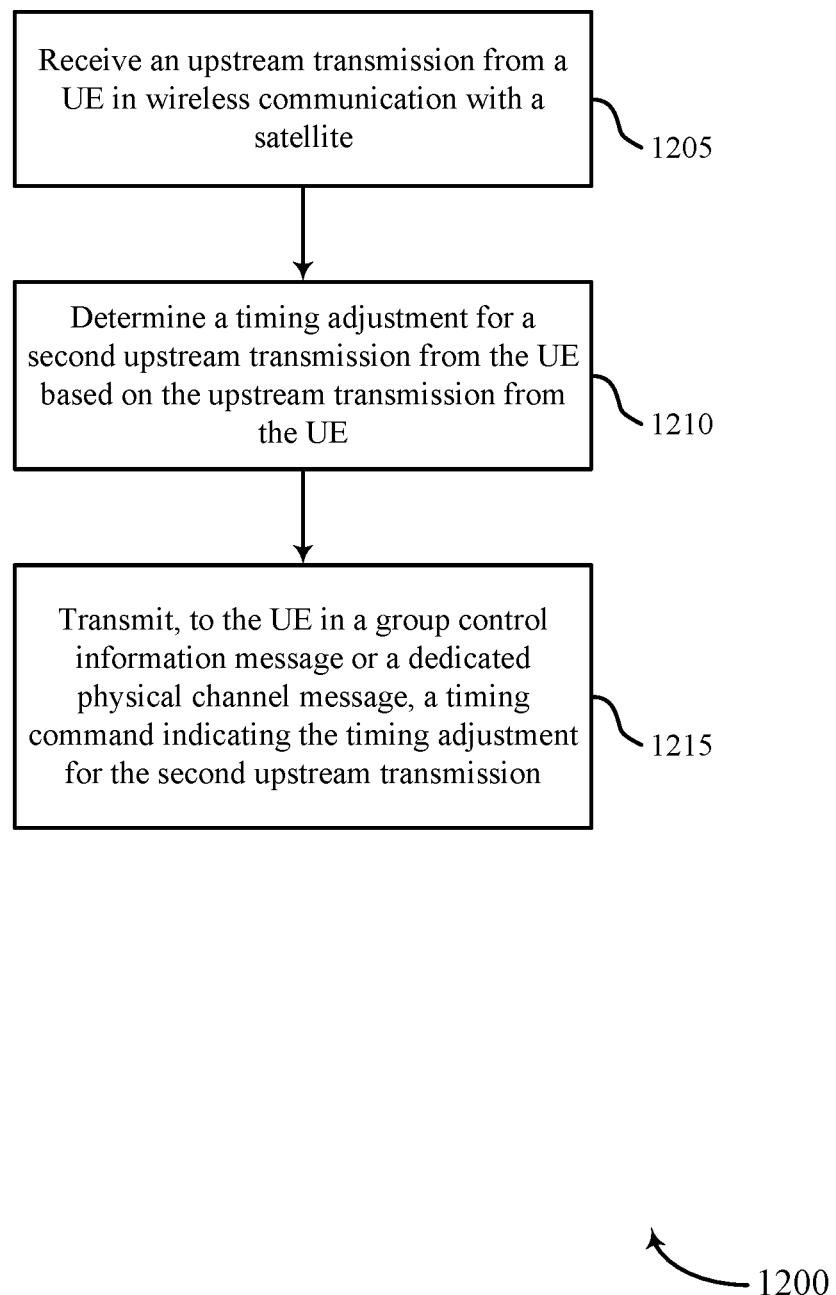
FIGS. 12 through 16 show flowcharts illustrating methods that support upstream timing control mechanisms for non-terrestrial networks in accordance with aspects of the present disclosure.

FIG. 12 shows a flowchart illustrating a method 1200 that supports upstream timing control mechanisms for non-terrestrial networks in accordance with aspects of the present disclosure. The operations of method 1200 may be implemented by a network device or its components as described herein, for example, a base station 105. For example, the operations of method 1200 may be performed by a communications manager as described with reference to FIGS. 8 through 11. In some examples, a network device may execute a set of instructions to control the functional elements of the network device to perform the functions described below. Additionally, or alternatively, a network device may perform aspects of the functions described below using special-purpose hardware.

At 1205, the network device may receive an upstream transmission from a UE in wireless communication with a satellite. The operations of 1205 may be performed according to the methods described herein. In some examples, aspects of the operations of 1205 may be performed by a receiver as described with reference to FIGS. 8 through 11.

At 1210, the network device may determine a timing adjustment for a second upstream transmission from the UE based on the upstream transmission from the UE. The operations of 1210 may be performed according to the methods described herein. In some examples, aspects of the operations of 1210 may be performed by a timing component as described with reference to FIGS. 8 through 11.

At 1215, the network device may transmit, to the UE in a group control information message or a dedicated physical channel message, a timing command indicating the timing adjustment for the second upstream transmission. The operations of 1215 may be performed according to the methods described herein. In some examples, aspects of the operations of 1215 may be performed by a transmitter as described with reference to FIGS. 8 through 11.

Figure 13:
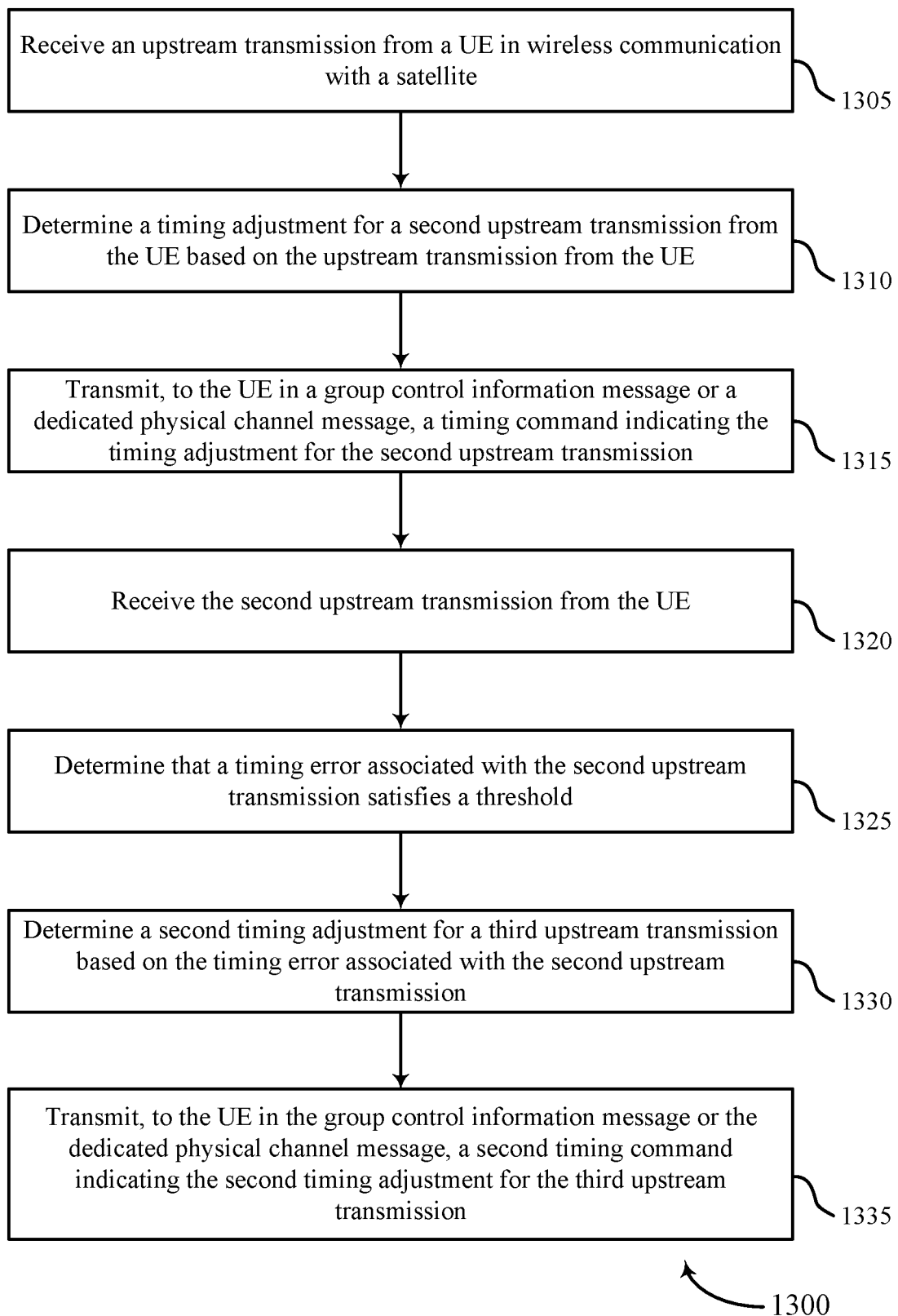

FIG. 13 shows a flowchart illustrating a method 1300 that supports upstream timing control mechanisms for non-terrestrial networks in accordance with aspects of the present disclosure. The operations of method 1300 may be implemented by a network device or its components as described herein, for example, a base station 105. For example, the operations of method 1300 may be performed by a communications manager as described with reference to FIGS. 8 through 11. In some examples, a network device may execute a set of instructions to control the functional elements of the network device to perform the functions described below. Additionally, or alternatively, a network device may perform aspects of the functions described below using special-purpose hardware.

At 1305, the network device may receive an upstream transmission from a UE in wireless communication with a satellite. The operations of 1305 may be performed according to the methods described herein. In some examples, aspects of the operations of 1305 may be performed by a receiver as described with reference to FIGS. 8 through 11.

At 1310, the network device may determine a timing adjustment for a second upstream transmission from the UE based on the upstream transmission from the UE. The operations of 1310 may be performed according to the methods described herein. In some examples, aspects of the operations of 1310 may be performed by a timing component as described with reference to FIGS. 8 through 11.

At 1315, the network device may transmit, to the UE in a group control information message or a dedicated physical channel message, a timing command indicating the timing adjustment for the second upstream transmission. The operations of 1315 may be performed according to the methods described herein. In some examples, aspects of the operations of 1315 may be performed by a transmitter as described with reference to FIGS. 8 through 11.

At 1320, the network device may receive the second upstream transmission from the UE. The operations of 1320 may be performed according to the methods described herein. In some examples, aspects of the operations of 1320 may be performed by a receiver as described with reference to FIGS. 8 through 11.

At 1325, the network device may determine that a timing error associated with the second upstream transmission satisfies a threshold. The operations of 1325 may be performed according to the methods described herein. In some examples, aspects of the operations of 1325 may be performed by a timing component as described with reference to FIGS. 8 through 11.

At 1330, the network device may determine a second timing adjustment for a third upstream transmission based on the timing error associated with the second upstream transmission. The operations of 1330 may be performed according to the methods described herein. In some examples, aspects of the operations of 1330 may be performed by a timing component as described with reference to FIGS. 8 through 11.

At 1335, the network device may transmit, to the UE in the group control information message or the dedicated physical channel message, a second timing command indicating the second timing adjustment for the third upstream transmission. The operations of 1335 may be performed according to the methods described herein. In some examples, aspects of the operations of 1335 may be performed by a transmitter as described with reference to FIGS. 8 through 11.

Figure 14:
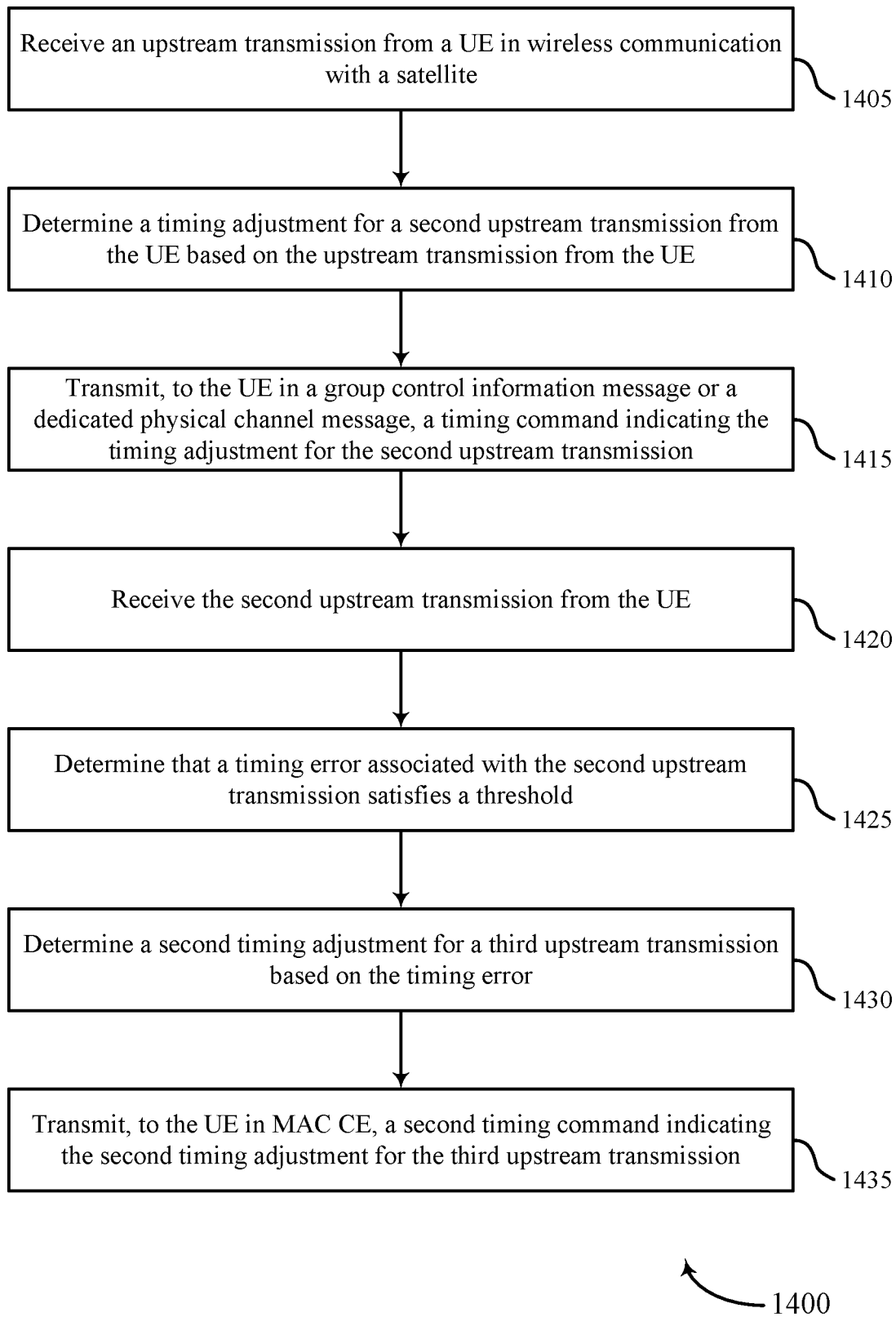

FIG. 14 shows a flowchart illustrating a method 1400 that supports upstream timing control mechanisms for non-terrestrial networks in accordance with aspects of the present disclosure. The operations of method 1400 may be implemented by a network device or its components as described herein, for example, a base station 105. For example, the operations of method 1400 may be performed by a communications manager as described with reference to FIGS. 8 through 11. In some examples, a network device may execute a set of instructions to control the functional elements of the network device to perform the functions described below. Additionally, or alternatively, a network device may perform aspects of the functions described below using special-purpose hardware.

At 1405, the network device may receive an upstream transmission from a UE in wireless communication with a satellite. The operations of 1405 may be performed according to the methods described herein. In some examples, aspects of the operations of 1405 may be performed by a receiver as described with reference to FIGS. 8 through 11.

At 1410, the network device may determine a timing adjustment for a second upstream transmission from the UE based on the upstream transmission from the UE. The operations of 1410 may be performed according to the methods described herein. In some examples, aspects of the operations of 1410 may be performed by a timing component as described with reference to FIGS. 8 through 11.

At 1415, the network device may transmit, to the UE in a group control information message or a dedicated physical channel message, a timing command indicating the timing adjustment for the second upstream transmission. The operations of 1415 may be performed according to the methods described herein. In some examples, aspects of the operations of 1415 may be performed by a transmitter as described with reference to FIGS. 8 through 11.

At 1420, the network device may receive the second upstream transmission from the UE. The operations of 1420 may be performed according to the methods described herein. In some examples, aspects of the operations of 1420 may be performed by a receiver as described with reference to FIGS. 8 through 11.

At 1425, the network device may determine that a timing error associated with the second upstream transmission satisfies a threshold. The operations of 1425 may be performed according to the methods described herein. In some examples, aspects of the operations of 1425 may be performed by a timing component as described with reference to FIGS. 8 through 11.

At 1430, the network device may determine a second timing adjustment for a third upstream transmission based on the timing error. The operations of 1430 may be performed according to the methods described herein. In some examples, aspects of the operations of 1430 may be performed by a timing component as described with reference to FIGS. 8 through 11.

At 1435, the network device may transmit, to the UE in MAC-CE, a second timing command indicating the second timing adjustment for the third upstream transmission. The operations of 1435 may be performed according to the methods described herein. In some examples, aspects of the operations of 1435 may be performed by a transmitter as described with reference to FIGS. 8 through 11.

Figure 15:
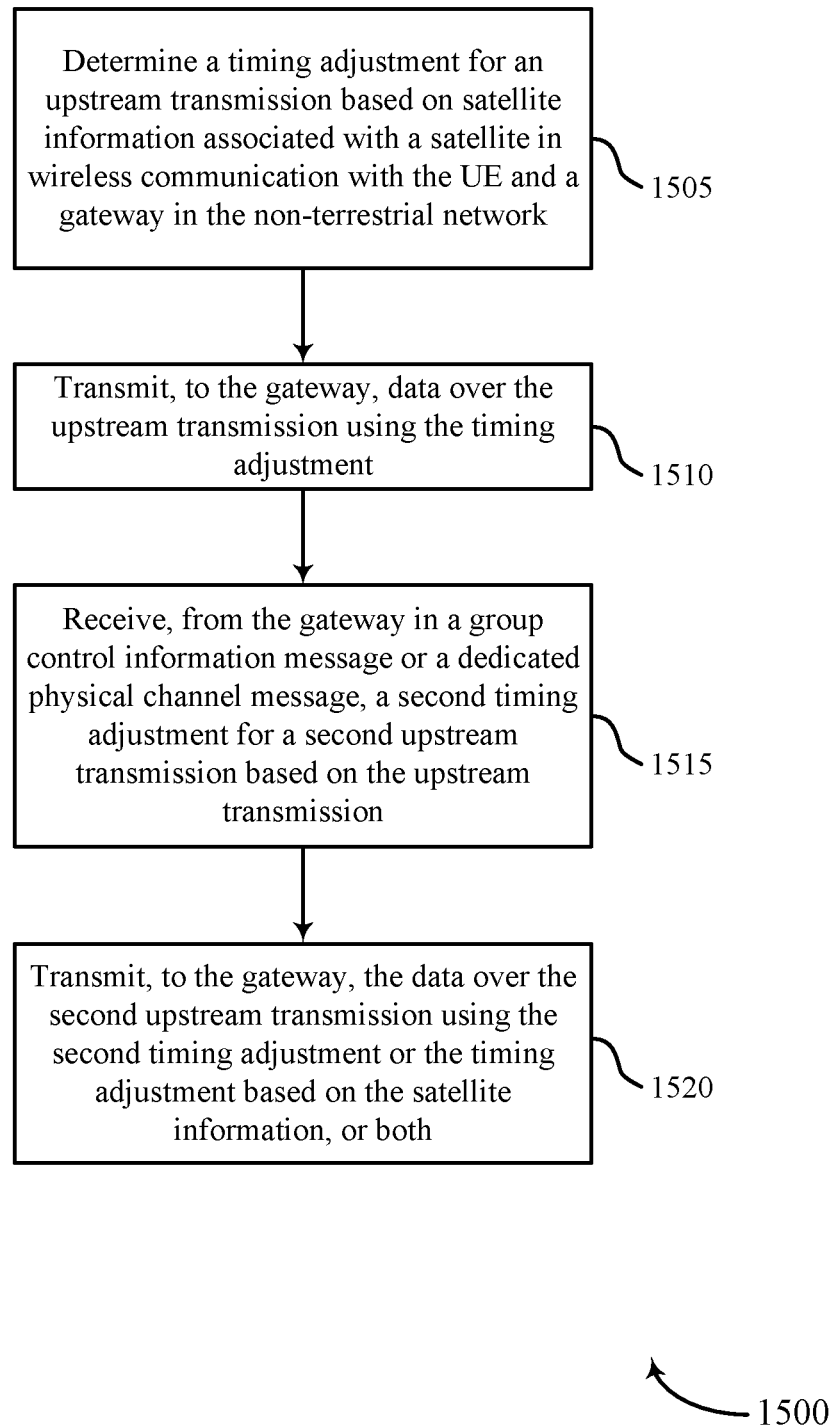

FIG. 15 shows a flowchart illustrating a method 1500 that supports upstream timing control mechanisms for non-terrestrial networks in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1505, the UE may determine a timing adjustment for an upstream transmission based on satellite information associated with a satellite in wireless communication with the UE and a gateway in the non-terrestrial network. The operations of 1505 may be performed according to the methods described herein. In some examples, aspects of the operations of 1505 may be performed by a timing component as described with reference to FIGS. 4 through 7.

At 1510, the UE may transmit, to the gateway, data over the upstream transmission using the timing adjustment. The operations of 1510 may be performed according to the methods described herein. In some examples, aspects of the operations of 1510 may be performed by a transmitter as described with reference to FIGS. 4 through 7.

At 1515, the UE may receive, from the gateway in a group control information message or a dedicated physical channel message, a second timing adjustment for a second upstream transmission based on the upstream transmission. The operations of 1515 may be performed according to the methods described herein. In some examples, aspects of the operations of 1515 may be performed by a receiver as described with reference to FIGS. 4 through 7.

At 1520, the UE may transmit, to the gateway, the data over the second upstream transmission using the second timing adjustment or the timing adjustment based on the satellite information, or both. The operations of 1520 may be performed according to the methods described herein. In some examples, aspects of the operations of 1520 may be performed by a transmitter as described with reference to FIGS. 4 through 7.

Figure 16:
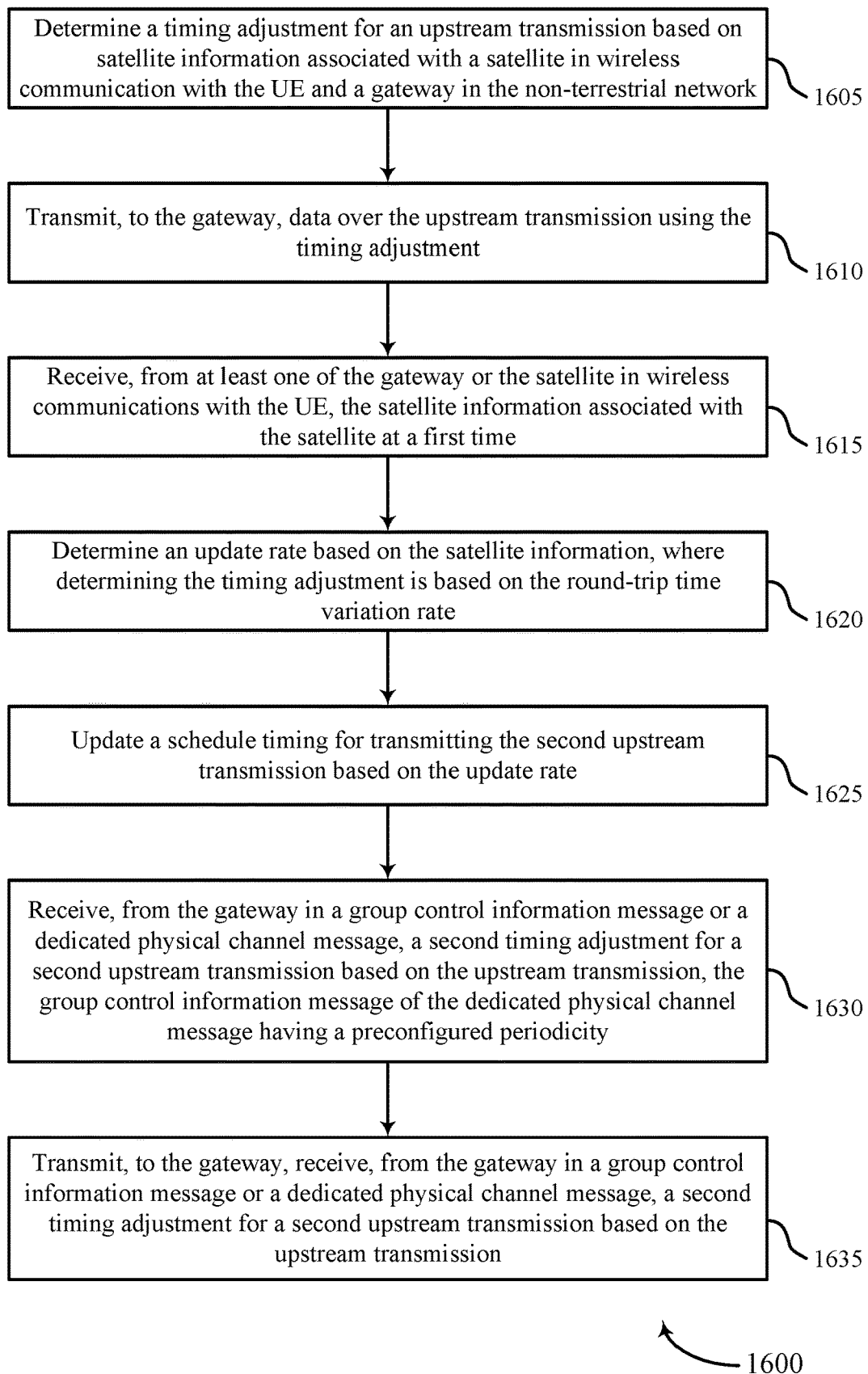

FIG. 16 shows a flowchart illustrating a method 1600 that supports upstream timing control mechanisms for non-terrestrial networks in accordance with aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1605, the UE may determine a timing adjustment for an upstream transmission based on satellite information associated with a satellite in wireless communication with the UE and a gateway in the non-terrestrial network. The operations of 1605 may be performed according to the methods described herein. In some examples, aspects of the operations of 1605 may be performed by a timing component as described with reference to FIGS. 4 through 7.

At 1610, the UE may transmit, to the gateway, data over the upstream transmission using the timing adjustment. The operations of 1610 may be performed according to the methods described herein. In some examples, aspects of the operations of 1610 may be performed by a transmitter as described with reference to FIGS. 4 through 7.

At 1615, the UE may receive, from at least one of the gateway or the satellite in wireless communications with the UE, the satellite information associated with the satellite at a first time. The operations of 1615 may be performed according to the methods described herein. In some examples, aspects of the operations of 1615 may be performed by a receiver as described with reference to FIGS. 4 through 7.

At 1620, the UE may determine an update rate based on the satellite information. The operations of 1620 may be performed according to the methods described herein. In some examples, aspects of the operations of 1620 may be performed by an RTT component as described with reference to FIGS. 4 through 7.

At 1625, the UE may update a schedule timing for transmitting the second upstream transmission based on the update rate, where transmitting, to the gateway, the data over the second upstream transmission is based on the updating. The operations of 1625 may be performed according to the methods described herein. In some examples, aspects of the operations of 1625 may be performed by a timing component as described with reference to FIGS. 4 through 7.

At 1630, the UE may receive, from the gateway in a group control information message or a dedicated physical channel message, a second timing adjustment for a second upstream transmission based on the upstream transmission. The operations of 1630 may be performed according to the methods described herein. In some examples, aspects of the operations of 1630 may be performed by a receiver as described with reference to FIGS. 4 through 7.

At 1635, the UE may transmit, to the gateway, receive, from the gateway in a group control information message or a dedicated physical channel message, a second timing adjustment for a second upstream transmission based on the upstream transmission. The operations of 1635 may be performed according to the methods described herein. In some examples, aspects of the operations of 1635 may be performed by a transmitter as described with reference to FIGS. 4 through 7.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a gateway in a non-terrestrial network, comprising:
   receiving, at the gateway, a first upstream transmission from a user equipment (UE) in wireless communication with the gateway and a satellite that is different than the gateway;
   determining, by the gateway, a timing adjustment for a second upstream transmission from the UE based at least in part on the first upstream transmission from the UE; and
   transmitting, from the gateway to the UE in a group control information message or a dedicated physical channel message, a timing command indicating the timing adjustment for the second upstream transmission.

2. The method of claim 1, further comprising:
   generating a configuration for the UE comprising a reference signal (RS) periodicity, an indication of a symbol of a slot, and an indication of frequency resources for the first upstream transmission or the second upstream transmission, or both; and
   transmitting the configuration to the UE during a connection procedure with the UE, wherein transmitting the timing command is based at least in part on the configuration.

3. The method of claim 2, further comprising:
   periodically transmitting the timing command, the group control information message, or the dedicated physical channel message, or a combination thereof.

4. The method of claim 2, wherein the configuration comprising the RS periodicity, the indication of the symbol of the slot, and the indication of frequency resources for the first upstream transmission or the second upstream transmission, or both are preconfigured for the UE.

5. The method of claim 2, further comprising:
   determining that the UE was in a discontinuous reception (DRX) mode before receiving the configuration,
   wherein generating the configuration comprises assigning, based at least in part on determining that the UE was in the DRX mode, a first gap period before a RS transmission and a second gap period after the RS transmission.

6. The method of claim 2, further comprising:
   determining a subcarrier spacing (SCS) based at least in part on the first upstream transmission, wherein generating the configuration is based at least in part on the SCS.

7. The method of claim 1, further comprising:
   assigning the group control information message to the UE and one or more additional UEs within a geographical area associated with a transmission beam of the satellite, the group control information message comprising a command for each UE associated with the group control information message,
   wherein transmitting the timing command is based at least in part on assigning the group control information message to the UE.

8. The method of claim 1, further comprising:
   transmitting, to the UE, satellite information associated with the satellite based at least in part on a preconfigured schedule, the satellite information comprising an update rate associated with the satellite or a satellite beam and comprising one or more parameters.

9. The method of claim 8, wherein the one or more parameters comprise a velocity of the satellite relative to a point of a geographical area associated with a transmission beam of the satellite.

10. The method of claim 1, further comprising:
receiving the second upstream transmission from the UE;
determining that a timing error associated with the second upstream transmission satisfies a threshold;
determining a second timing adjustment for a third upstream transmission based at least in part on the timing error associated with the second upstream transmission; and
transmitting, to the UE in the group control information message or the dedicated physical channel message, a second timing command indicating the second timing adjustment for the third upstream transmission.

11. The method of claim 1, further comprising:
receiving the second upstream transmission from the UE;
determining that a timing error associated with the second upstream transmission satisfies a threshold;
determining a second timing adjustment for a third upstream transmission based at least in part on the timing error; and
transmitting, to the UE in medium access control (MAC) control element (CE), a second timing command indicating the second timing adjustment for the third upstream transmission.

12. The method of claim 1, wherein the gateway comprises a base station, the method further comprising:
receiving data in the second upstream transmission from the UE; and
forwarding, by the gateway, the received data from the UE to the satellite.

13. A method for wireless communications at a user equipment (UE), comprising:
determining a timing adjustment for a first upstream transmission based at least in part on satellite information associated with a satellite in wireless communication with the UE and a gateway that is different than the satellite in a non-terrestrial network;
transmitting, to the gateway, data over the first upstream transmission using the timing adjustment;
receiving, from the gateway in a group control information message or a dedicated physical channel message, a second timing adjustment for a second upstream transmission based at least in part on the first upstream transmission; and
transmitting, to the gateway, the data over the second upstream transmission using the second timing adjustment or the timing adjustment based on the satellite information, or both.

14. The method of claim 13, further comprising:
receiving a configuration during a connection procedure with the gateway, the configuration indicating timing resources and frequency resources for receiving timing adjustments from the gateway; and
decoding the group control information message or the dedicated physical channel message based at least in part on the configuration, wherein receiving the second timing adjustment for the second upstream transmission is based at least in part on decoding the group control information message or the dedicated physical channel message.

15. The method of claim 13, further comprising:
receiving, from at least one of the gateway or the satellite in wireless communications with the UE, the satellite information associated with the satellite at a first time; and
determining an update rate based at least in part on the satellite information, wherein determining the timing adjustment is based at least in part on the update rate.

16. The method of claim 15, further comprising:
updating a schedule timing for transmitting the second upstream transmission based at least in part on the update rate, wherein transmitting, to the gateway, the data over the second upstream transmission is based at least in part on the updating.

17. The method of claim 15, wherein the satellite information comprises a velocity of the satellite relative to a point of a geographical area associated with a transmission beam of the satellite.

18. The method of claim 15, further comprising:
determining that the UE is within a geographical area associated with a transmission beam of the satellite,
wherein determining the update rate is based at least in part on the UE determining that it is within the geographical area associated with the transmission beam.

19. The method of claim 15, further comprising:
receiving, from at least one of the gateway or the satellite in wireless communications with the UE, second satellite information associated with the satellite at a second time after the first time; and
determining, by the UE, a third timing adjustment for a third upstream transmission based at least in part on the second satellite information received at the second time,
wherein transmitting, to the gateway, the data is based at least in part on transmitting the data over the third upstream transmission using the third timing adjustment and the timing adjustment based at least in part on the update rate.

20. The method of claim 19, further comprising:
receiving, from the gateway, a fourth timing adjustment based at least in part on the third upstream transmission using the third timing adjustment,
wherein transmitting, to the gateway, the data is based at least in part on transmitting the data over a fourth upstream transmission using the fourth timing adjustment.

21. The method of claim 13, wherein the second timing adjustment for the second upstream transmission is received in a medium access control (MAC) control element (CE).

22. The method of claim 13, wherein the second timing adjustment for the second upstream transmission is received at a preconfigured frequency resource.

23. The method of claim 13, wherein determining the timing adjustment for the first upstream transmission is performed autonomously by the UE.

24. The method of claim 13, wherein the timing adjustment for the first upstream transmission is based at least in part on an update rate and timing command received from the gateway.

25. The method of claim 13, further comprising:
periodically receiving, from the gateway, a third command corresponding to a third timing adjustment for a corresponding third upstream transmission based at least in part on a subcarrier spacing (SCS) associated with the corresponding third upstream transmission.

26. The method of claim 13, further comprising:

transmitting a reference signal (RS) to the gateway based at least in part on a RS periodicity preconfigured by the gateway, wherein receiving the second timing adjustment for the second upstream transmission is further based at least in part on transmitting the RS to the gateway.

27. An apparatus for wireless communications, comprising:

a processor, memory in electronic communication with the processor; and instructions stored in the memory and executable by the processor to cause the apparatus to:

receive, at the apparatus in a non-terrestrial network, a first upstream transmission from a user equipment (UE) in wireless communication with the apparatus and a satellite that is different than the apparatus;

determine, by the apparatus, a timing adjustment for a second upstream transmission from the UE based at least in part on the first upstream transmission from the UE; and transmit, from the apparatus to the UE in a group control information message or a dedicated physical channel message, a timing command indicating the timing adjustment for the second upstream transmission.

28. The apparatus of claim 27, wherein the instructions are further executable by the processor to cause the apparatus to:

generate a configuration for the UE comprising a reference signal (RS) periodicity, an indication of a symbol of a slot, and an indication of frequency resources for the first upstream transmission or the second upstream transmission, or both; and transmit the configuration to the UE during a connection procedure with the UE, wherein transmitting the timing command is based at least in part on the configuration.

29. The apparatus of claim 28, wherein the instructions are further executable by the processor to cause the apparatus to:

periodically transmit the timing command, the group control information message, or the dedicated physical channel message, or a combination thereof.

30. An apparatus for wireless communications, comprising:

a processor, memory in electronic communication with the processor; and instructions stored in the memory and executable by the processor to cause the apparatus to:

determine a timing adjustment for a first upstream transmission based at least in part on satellite information associated with a satellite in wireless communication with the apparatus and a gateway that is different than the satellite in a non-terrestrial network;

transmit, to the gateway, data over the first upstream transmission using the timing adjustment;

receive, from the gateway in a group control information message or a dedicated physical channel message, a second timing adjustment for a second upstream transmission based at least in part on the first upstream transmission; and transmit, to the gateway, the data over the second upstream transmission using the second timing adjustment or the timing adjustment based on the satellite information, or both.

31. The apparatus of claim 30, wherein the instructions are further executable by the processor to cause the apparatus to:

receive a configuration during a connection procedure with the gateway, the configuration indicating timing resources and frequency resources for receiving timing adjustments from the gateway; and decode the group control information message or the dedicated physical channel message based at least in part on the configuration, wherein receiving the second timing adjustment for the second upstream transmission is based at least in part on decoding the group control information message or the dedicated physical channel message.

* * * * *